(12) United States Patent
Yoo et al.

(10) Patent No.: US 10,048,767 B2
(45) Date of Patent: Aug. 14, 2018

(54) ELECTRONIC APPARATUS AND METHOD OF CONTROLLING MULTI-VISION SCREEN INCLUDING A PLURALITY OF DISPLAY APPARATUSES

(71) Applicant: Samsung Electronics Co., Ltd., Suwon-si, Gyeonggi-do (KR)

(72) Inventors: Eun-kyung Yoo, Seoul (KR); Ja-ok Koo, Yongin-si (KR); Hyun-soo Nah, Seoul (KR); Tae-ho Wang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 14/926,694

(22) Filed: Oct. 29, 2015

(65) Prior Publication Data

US 2016/0132174 A1 May 12, 2016

Related U.S. Application Data

(60) Provisional application No. 62/076,074, filed on Nov. 6, 2014, provisional application No. 62/088,065, filed on Dec. 5, 2014.

(30) Foreign Application Priority Data

Mar. 10, 2015 (KR) ........................ 10-2015-0033177

(51) Int. Cl.
*G06F 3/01* (2006.01)
*G06F 3/14* (2006.01)
*G06F 3/03* (2006.01)
*G06F 3/0482* (2013.01)
(Continued)

(52) U.S. Cl.
CPC ............ *G06F 3/017* (2013.01); *G06F 3/0304* (2013.01); *G06F 3/03547* (2013.01); *G06F 3/0482* (2013.01); *G06F 3/04883* (2013.01); *G06F 3/1446* (2013.01); *G06F 2203/04803* (2013.01); *G09G 2300/02* (2013.01)

(58) Field of Classification Search
CPC ...................................................... G06F 3/1446
See application file for complete search history.

(56) References Cited

U.S. PATENT DOCUMENTS

2003/0107588 A1* 6/2003 Elsbree ..................... G06F 8/38
715/700
2007/0229467 A1* 10/2007 Sakai ................... G11B 19/025
345/173

(Continued)

FOREIGN PATENT DOCUMENTS

KR    10-2014-0066384 A    6/2014

*Primary Examiner* — Chad Dicke
(74) *Attorney, Agent, or Firm* — Jefferson IP Law, LLP

(57) ABSTRACT

A display apparatus, an electronic apparatus, and a method of controlling a screen of a display apparatus are provided. The electronic apparatus is configured to display a division guide line in response to a touch being detected on a bezel of a plurality of display apparatuses displaying a multi-vision screen including a main area and a sub area to change the main area and the sub area, and change a size and a position of a main area based on a division guide line displayed in response to a touch being detected on a bezel of the plurality of display apparatuses displaying a multi-vision screen including the main area and a sub area.

20 Claims, 15 Drawing Sheets

(51) Int. Cl.
  *G06F 3/0488*  (2013.01)
  *G06F 3/0354*  (2013.01)

(56) References Cited

U.S. PATENT DOCUMENTS

| | | | |
|---|---|---|---|
| 2010/0081475 A1* | 4/2010 | Chiang | G06F 3/0483 |
| | | | 455/564 |
| 2011/0018849 A1* | 1/2011 | Lowe | G06F 1/1605 |
| | | | 345/205 |
| 2011/0187657 A1 | 8/2011 | Knowles | |
| 2011/0205163 A1* | 8/2011 | Hinckley | G06F 3/0483 |
| | | | 345/173 |
| 2011/0231783 A1* | 9/2011 | Nomura | G06F 3/0488 |
| | | | 715/761 |
| 2011/0291964 A1* | 12/2011 | Chambers | G06F 1/1616 |
| | | | 345/173 |
| 2014/0145984 A1 | 5/2014 | Yoon et al. | |
| 2014/0189602 A1* | 7/2014 | Wang | G06F 3/1454 |
| | | | 715/863 |
| 2014/0195953 A1* | 7/2014 | Sakai | G06F 3/04883 |
| | | | 715/771 |
| 2015/0084837 A1* | 3/2015 | Mese | G06F 3/1446 |
| | | | 345/1.3 |

\* cited by examiner

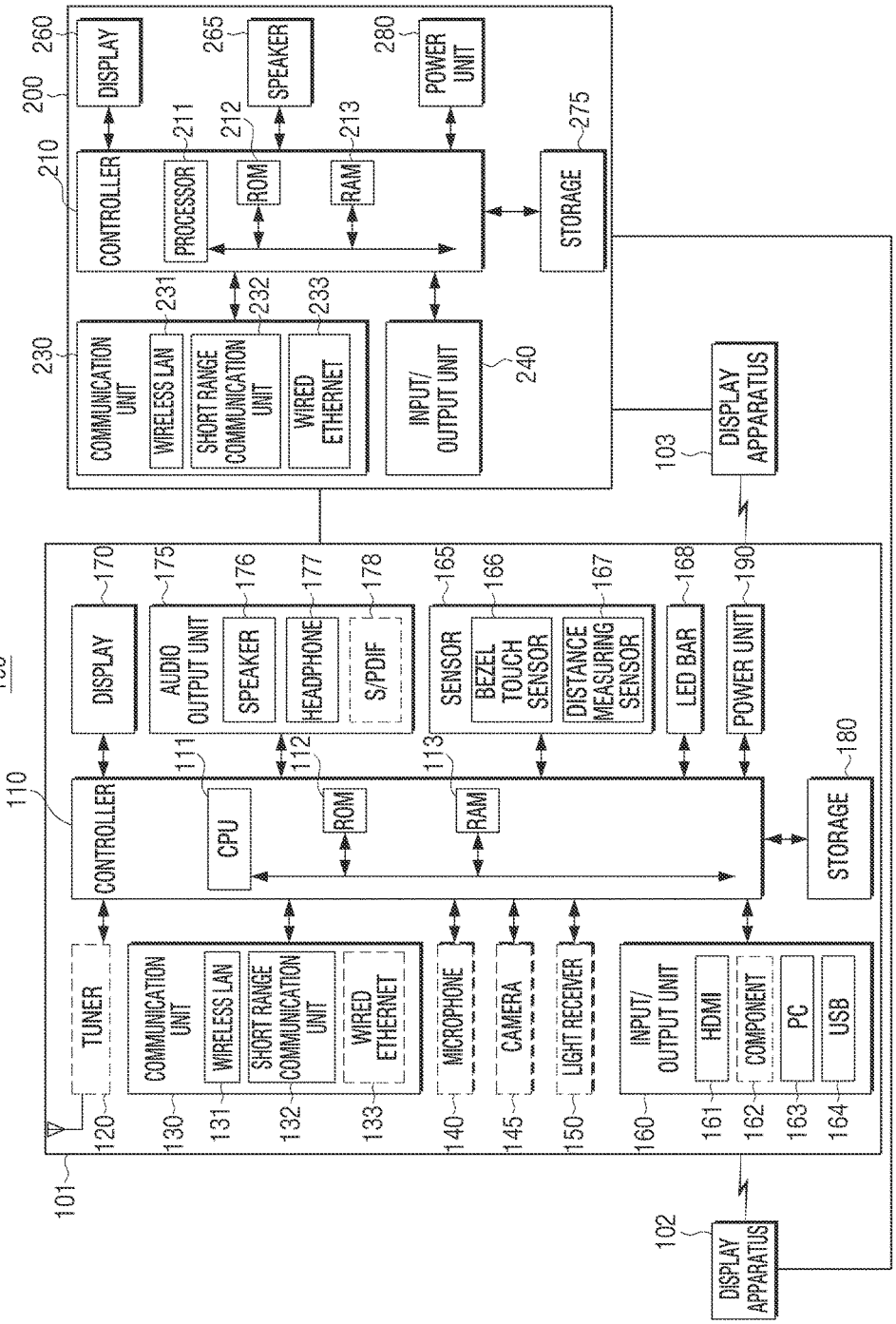

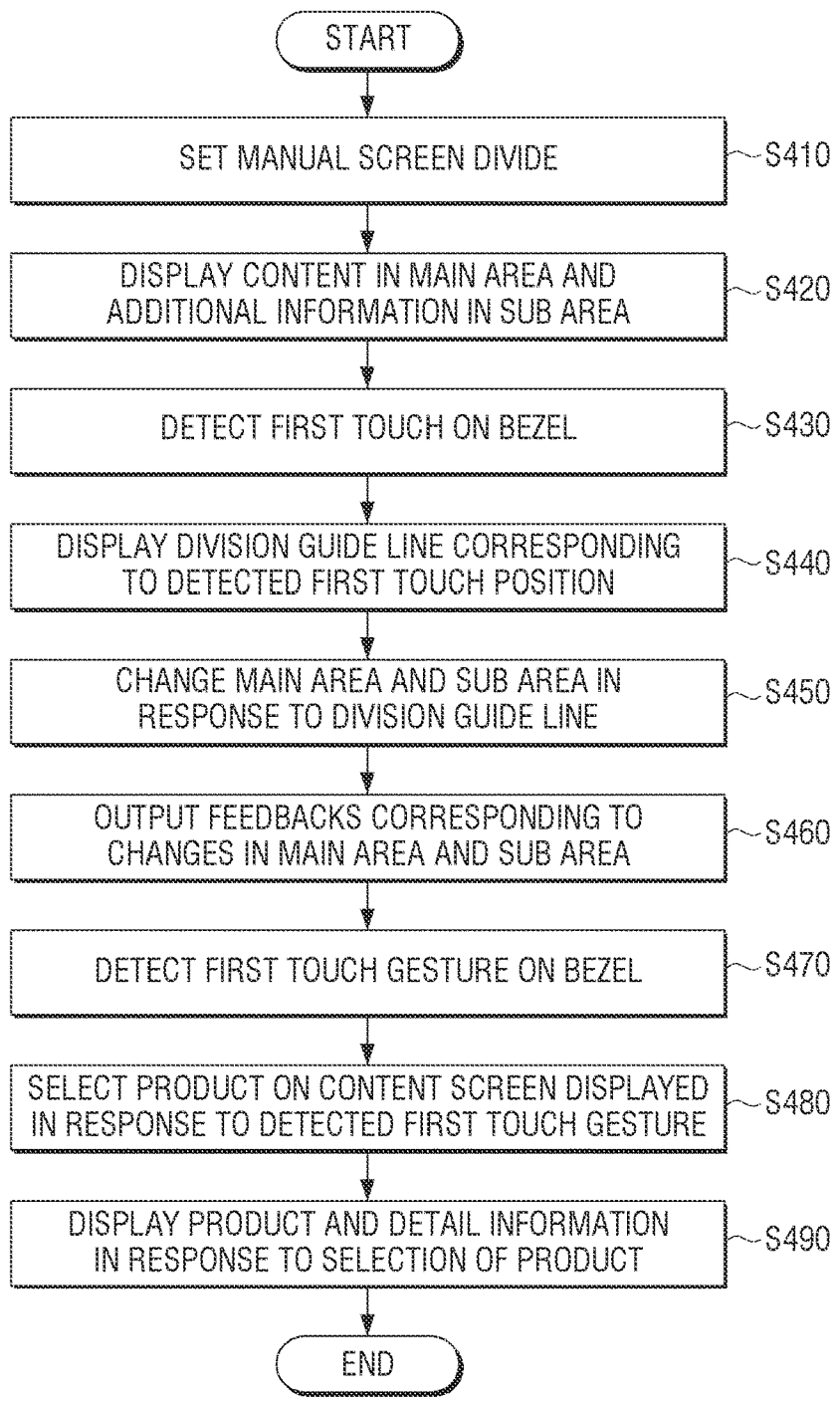

ELECTRONIC APPARATUS AND METHOD OF CONTROLLING MULTI-VISION SCREEN INCLUDING A PLURALITY OF DISPLAY APPARATUSES

CROSS-REFERENCE TO RELATED APPLICATION(S)

This application claims the benefit under 35 U.S.C. § 119(e) of a U.S. provisional patent application filed on Nov. 6, 2014 in the U.S. Patent and Trademark Office and assigned Ser. No. 62/076,074, and of a U.S. provisional patent application filed on Dec. 5, 2014 in the U.S. Patent and Trademark Office and assigned Ser. No. 62/088,065, and under 35 U.S.C. § 119(a) of a Korean patent application filed on Mar. 10, 2015 in the Korean Intellectual Property Office and assigned Serial number 10-2015-0033177, the entire disclosure of each of which is hereby incorporated by reference.

TECHNICAL FIELD

The present disclosure relates to an electronic apparatus and a method of controlling a screen of a display apparatus of the electronic apparatus. More particularly, the present disclosure relates to an electronic apparatus that changes a main area and a sub area in response to a touch detected on a bezel of a plurality of display apparatuses displaying a multi-vision screen including the main area and the sub area, and a method of controlling a screen of a display apparatus of the electronic apparatus.

BACKGROUND

Various types of services and functions that are provided from a display apparatus have gradually extended. A display apparatus may provide attendees with various types of information about an exhibition or a performance in an exhibition center or a performing place. A need for a connection of the display apparatus to another display apparatus by wireless or wire has increased.

A multi-vision is a composite display method of displaying one content by using a plurality of display apparatuses. If a high-resolution large image or moving picture is displayed, there may be used a multi-vision method that uses a plurality of display apparatuses rather than one display apparatus having a size limitation of a screen.

Therefore, a need exists for a method of controlling a screen of a display apparatus of an electronic apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of controlling a screen of a display apparatus of an electronic apparatus. The method includes displaying a content in a main area of a multi-vision screen including a plurality of display apparatuses and additional information in a sub area of the multi-vision screen, receiving a first touch detected on a bezel of one display apparatus of the plurality of display apparatuses, and changing one of an area and a position of the main area in response to the first touch. An area and a position of the sub area may also be changed in response to changes in the area and the position of the main area.

The method may further include displaying a division guide line on the multi-vision screen in response to the first touch. One of the area and the position of the main area may be changed in response to the displayed division guide line.

In accordance with an aspect of the present disclosure, an electronic apparatus is provided. The electronic apparatus includes a communication unit configured to connect a plurality of display apparatuses displaying a multi-vision screen including a main area and a sub area, and a controller configured to control the communication unit. The controller may receive first touch position information corresponding to a first touch detected on a bezel of one of the plurality of display apparatuses through the communication unit, transmit division guide line information corresponding to the first touch to the plurality of display apparatuses through the communication unit, and control to change one of an area and a position of the main area in response to the division guide line information.

Various embodiments of the present disclosure provide an electronic apparatus that changes a main area and a sub area in response to a touch detected on a bezel of a plurality of display apparatuses displaying a multi-vision screen including the main area and the sub area, and a method of controlling a screen of a display apparatus of the electronic apparatus.

Various embodiments of the present disclosure also provide an electronic apparatus that displays a division guide line in response to a touch detected on a bezel of a plurality of display apparatuses displaying a multi-vision screen including a main area and a sub area and changes areas of the main area and the sub area in response to the displayed division guide line, and a method of controlling a screen of a display apparatus of the electronic apparatus.

Various embodiments of the present disclosure also provide an electronic apparatus that displays a division guide line in response to a touch detected on a bezel of a plurality of display apparatuses displaying a multi-vision screen including a main area and a sub area and changes positions of the main are and the sub area in response to the displayed division guide line, and a method of controlling a screen of a display apparatus of the electronic apparatus.

A user may change a main area and a sub area by using a touch detected on a bezel of one of a plurality of display apparatuses displaying a multi-vision screen including the main area and the sub area.

According to various embodiments of the present disclosure, there are provided an electronic apparatus that changes a main area and a sub area by using a touch detected on a bezel of a plurality of display apparatuses displaying a multi-vision screen including the main area and the sub area, and a method of displaying a screen of a display apparatus of the electronic apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2B is a block diagram illustrating a plurality of display apparatuses and an electronic apparatus according to an embodiment of the present disclosure;

FIG. 4 is a flowchart illustrating a method of displaying a screen of a display apparatus according to an embodiment of the present disclosure.

Throughout the drawings, it should be noted that like reference numbers are used to depict the same or similar elements, features, and structures.

DETAILED DESCRIPTION

Figure 1:
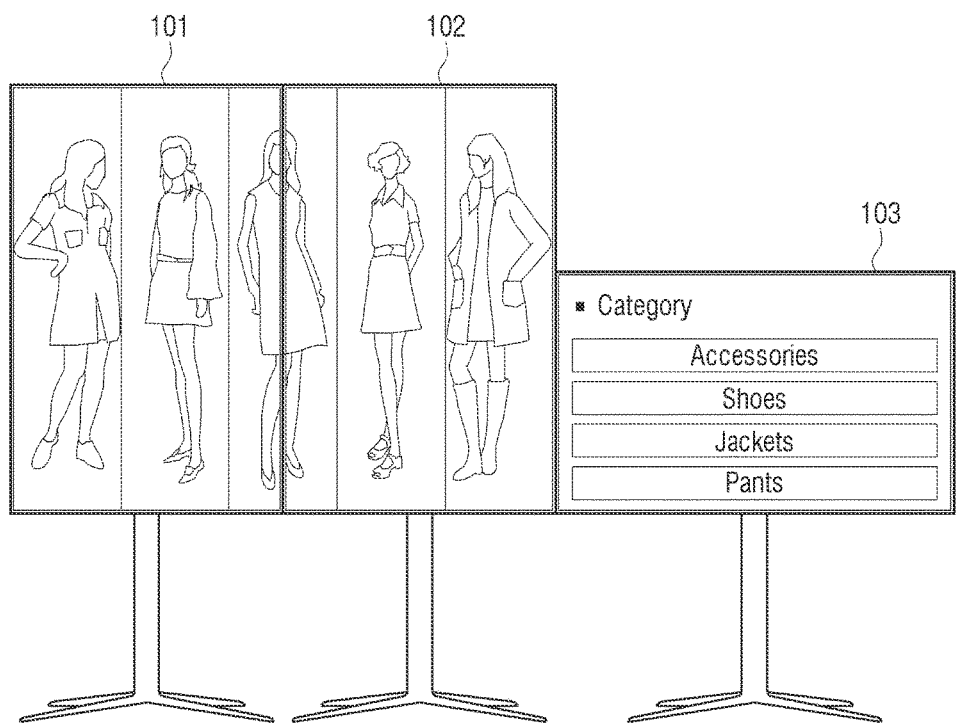
FIG. 1 is a schematic view illustrating operations of a plurality of display apparatuses according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide an electronic apparatus that changes a main area and a sub area in response to a touch detected on a bezel of a plurality of display apparatuses displaying a multi-vision screen including the main area and the sub area, and a method of controlling a screen of a display apparatus of the electronic apparatus.

In the following description, the same drawing reference numerals are used for the same elements even in different drawings. The matters defined in the description, such as detailed construction and elements, are provided to assist in a comprehensive understanding of the embodiments of the present disclosure. Thus, it is apparent that the various embodiments of the present disclosure can be carried out without those specifically defined matters. In addition, well-known functions or constructions are not described in detail since they would obscure the various embodiments of the present disclosure with unnecessary detail.

Although the terms first, second, third, and the like, may be used herein to describe various elements, these elements should not be limited by these terms. These terms are only used to distinguish one element from another element. Thus, a first element discussed below could be termed a second element, and, similarly, the second element could be termed the first element, without departing from the teachings of various embodiments of the present disclosure. As used herein, the term "and/or," includes any and all combinations of one or more of the associated listed items.

In various embodiments of the present disclosure, an application refers to software that may be executed in an operating system (OS) for a computer, a web OS, an OS for a display apparatus, or a mobile OS and thus used by a user. The application may refer to software for controlling a display apparatus through the user or a controller. For example, the application may include a word processor, a spread shift, a contact application, a calendar application, a memo application, an alarm application, a social network system (SNS) application, a chatting application, a map application, a music player, or a video player. The application according to various embodiments of the present disclosure may refer to software that is executed in a display apparatus or an electronic apparatus (e.g., a portable apparatus) connected to the display apparatus by wireless or wire. The application may also refer to software that is executed in a display apparatus in response to a user input that is received.

The term "user" used in various embodiments of the present disclosure may refer to a person who controls a function or an operation of the display apparatus by using a remote controller (not shown) and may include a user, a manager, or an installation engineer.

In various embodiments of the present disclosure, a "selection of a key" positioned in a remote controller may be used as a term indicating pressing or touching of the key.

In various embodiments of the present disclosure, a content may be displayed on a playable application. For example, the content may include a video file or an audio file played in a video player, which is one of applications, a music file played in a music player, a photo file displayed on a photo gallery, a webpage file displayed on a web browser, and the like.

The content may include a video file, an audio file, a text file, an image file, or a webpage that is displayed or executed on an application. The term "video" in various embodiments of the present disclosure may be used to indicate a moving picture. The content may also include a video file, an audio file, a text file, an image file, or a webpage executed in response to a user input (e.g., a touch, and the like) that is received. The content may include a video, an image, a text, or a web document. In addition, the content may include a video including an advertisement, an image including an advertisement, and a web document including an advertisement.

In various embodiments of the present disclosure, a widget refers to a mini application that is one of graphical user interfaces (GUIs) that further smoothly support an interaction between a user and an application or an OS. For example, examples of the widget include a weather widget, a calculator widget, a clock widget, and the like.

FIG. 1 is a schematic view illustrating operations of a plurality of display apparatuses according to an embodiment of the present disclosure.

Referring to FIG. 1, in various embodiments of the present disclosure, display apparatus 100 may include one display apparatus 101 or a plurality of display apparatuses 101 through 103. In addition, a controller 110 of the display apparatus 100 may include a controller 110 of the one display apparatus 101 or controllers 110 of the plurality of display apparatuses 101 through 103.

The terminology used herein is for the purpose of describing particular embodiments of the present disclosure only and is not intended to be limiting of various embodiments of the present disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof. Like reference numerals in the drawings denote like elements.

Referring to FIG. 1, a remote controller (not shown) and the plurality of display apparatuses 101 through 103 are displayed. The plurality of display apparatuses 101 through 103 may be connected to one another by wireless or cable. The plurality of display apparatuses 101 through 103 may contact one another based on a bezel. The plurality of display apparatuses 101 through 103 may be disposed to keep distances from one another (e.g., to be smaller than a size of a screen of a display apparatus) based on the bezel. The plurality of display apparatuses 101 through 103 that keep the distances from one another may be realized according to various embodiments of the present disclosure.

The remote controller (not shown) may control the display apparatuses 101 through 103 by using an infrared or short-range communication (e.g., Bluetooth (BT)). The remote controller may control a state (e.g., a power on and/or off) or a function (e.g., a multi-vision output, and the like) of the display apparatus 100 by using at least one of a selection of a key (including a button) (not shown), a touchpad (not shown), a microphone (not shown) that receives a voice of a user, and a sensor (not shown) that recognizes a motion of the remote controller.

The user may output an audio, a video, and/or additional information corresponding to a broadcast channel selected in the display apparatus 100 by using the remote controller. The user may manually divide a screen (e.g., may divide the screen into a main area displaying a content and a sub area displaying a menu) by using the remote controller. The user may also set a manual screen divide through settings 500 of the display apparatuses 101 through 103 shown in FIG. 5A by using the remote controller.

Referring to FIG. 1, three display apparatuses are connected to one another. However, according to another embodiment of the present disclosure, as shown in FIG. 5H, two display apparatuses, four display apparatuses, or five or more display apparatuses may be connected to one another.

In addition, according to another embodiment of the present disclosure, one display apparatus may be realized. As described with reference to FIG. 1, a plurality of display apparatuses are directly connected to one another but may be connected to one another through a sharer, a router, a wireless internet network, and the like.

Figure 2A:
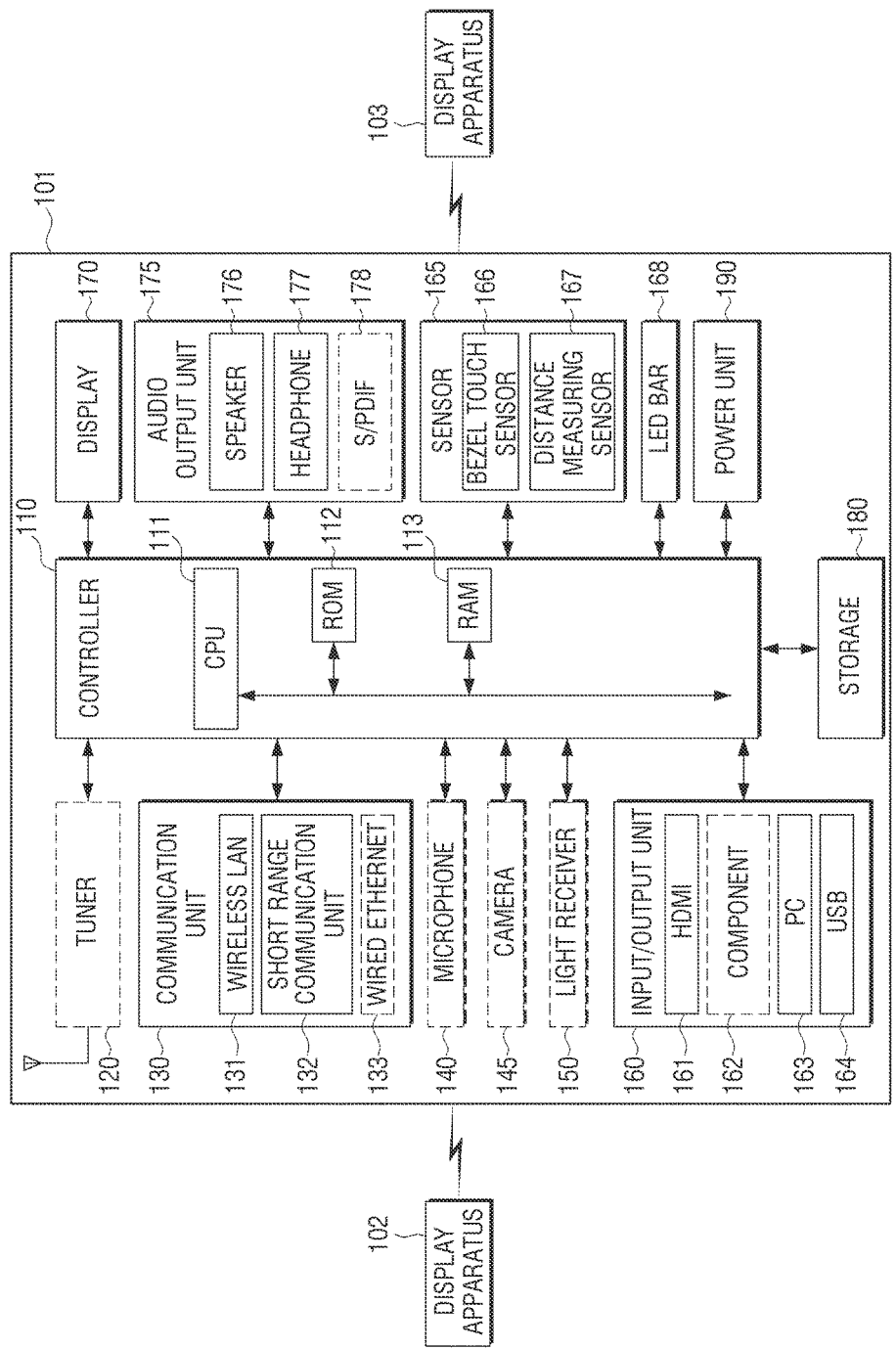
FIG. 2A is a block diagram illustrating a plurality of display apparatuses according to an embodiment of the present disclosure.

FIG. 2A is a block diagram illustrating a plurality of display apparatuses according to an embodiment of the present disclosure.

FIG. 2B is a block diagram illustrating a plurality of display apparatuses and an electronic apparatus according to an embodiment of the present disclosure.

Referring to FIG. 2A, a master display apparatus 101 receives a control signal from a remote controller (not shown) and may be connected to slave display apparatuses 102 and 103 by wireless or wire by using a communication unit 130. The master display apparatus 101 may also be connected to the slave display apparatuses 102 and 102 by wire by using an input/output (I/O) unit 160. A display apparatus 100 may include the master display apparatus 101 and the slave display apparatuses 102 and/or 103 that are controlled by the master display apparatus 101.

Referring to FIG. 2B, an electronic apparatus 200 may be connected to the display apparatus 100. The electronic apparatus 200 may also be connected to the master display apparatus 101 and the slave display apparatuses 102 and 103 by wireless or wire by using a communication unit 230. In addition, the electronic apparatus 200 may be connected to the master display apparatus 101 and the slave display apparatuses 102 and 103 by wire by using an I/O unit (not shown).

The display apparatus 100 may include a display unit 170, a tuner 120, the communication unit 130, and the I/O unit 160. The display apparatus 100 may also include combinations of the display unit 170, the tuner 120, the communication unit 130, and the I/O unit 160. In addition, the display apparatus 100 including the display unit 170 may be electrically connected to an additional external apparatus (e.g., a set-top box (not shown)) having a tuner.

The display apparatus 100 may be realized as a digital television (TV), a 3-dimensional (3D)-TV, a smart TV, a light-emitting diode (LED) TV, an organic LED (OLED) TV, a plasma TV, a monitor, an analog TV, a curved TV including a screen having a fixed curvature, a flexible TV including a screen having a fixed curvature, a bended TV including a screen having a fixed curvature, and/or a curvature variable TV that may change a curvature of a current screen through a user input that is received but is not limited thereto.

The display apparatus 100 includes the tuner 120, the communication unit 130, a microphone 140, a camera 145, a light receiver 150, the I/O unit 160, the display unit 170, an audio output unit 175, a storage unit 180, and a power unit 190. The display apparatus 100 may include a sensor (e.g., an illumination sensor, a temperature sensor, and the like (not shown)) that detects an internal or external state of the display apparatus 100.

A controller 110 may include a processor 111, a read only memory (ROM) 112 that stores a control program for controlling the display apparatus 100, and a random access memory (RAM) 113 that stores a signal or data input from an outside of the display apparatus 100 or is used as a storage area corresponding to various types of jobs performed in the display apparatus 100.

The controller 110 controls an overall operation of the display apparatus 100 and a signal flow between internal elements 120 through 190 of the display apparatus 100 and processes data. The controller 110 controls power that is supplied from the power unit 190 to the internal elements 120 through 180. In addition, if there is a user input or a preset and stored condition is satisfied, the controller 110 may execute an OS stored in the storage unit 180 and various types of applications.

The processor 111 may include a graphical processing unit (GPU) (not shown) that processes a graphic corresponding to an image or a video. The processor 111 may be realized as a system on chip (SoC) into which a core (not shown) and the GPU are integrated. The processor 111 may include a single core, a dual core, a triple core, a quad core, and a multiple core.

The processor 111 may include a plurality of processors. For example, the processor 111 may be realized as a main processor (not shown) and a sub processor (not shown) that operates in a sleep mode. In addition, the processor 111, the ROM 112, and the RAM 113 may be connected to one another through an internal bus.

The controller 110 may control a main area of a multi-vision screen including a plurality of display apparatuses to display a content and a sub area to display additional information, detect a first touch on a bezel of one display apparatus, change one of an area and a position of the main area in response to the first touch, and change an area and a position of the sub area in response to the changes in the area and the position of the main area.

The controller 110 may control a main area of a multi-vision screen including a plurality of display apparatuses to display a content and a sub area to display additional information, detect a first touch on a bezel of one display apparatus, display a division guide line on the multi-vision screen in response to the first touch, change one of an area and a position of the main area in response to the division guide line, and change an area and a position of the sub area in response to the changes in the area and the position of the main area.

The controller 110 may set a manual screen divide or end the setting of the manual screen divide of settings of the display apparatus 100.

The controller 110 may set a manual screen divide or end the setting of the manual screen divide through settings of the display apparatus 100 that is performed by an input of a user.

The controller 110 may control to detect a first touch by using a bezel touch sensor positioned in a bezel, and the first touch may include hovering.

The controller 110 may control to display a division guide line in response to first touch position information corresponding to a stored first touch or first hovering position information corresponding to first hovering.

The controller 110 may control to provide a feedback by using an LED bar of one of a plurality of display apparatuses in response to the display of the division guide line.

The controller 110 may control to make the division guide line flicker in response to the display of the division guide line.

The controller 110 may control to output a feedback corresponding to a change in one of an area and a position of a main area.

The controller 110 may scroll a content displayed in a changed main area in response to a direction of a detected first touch gesture.

The controller 110 may control to change a display mode of the content displayed in the changed man area in response to the first touch gesture.

The controller 110 may control to store the first touch position information corresponding to the first touch or the first hovering position information corresponding to the first hovering and respectively transmit the first touch position information and the first hovering position information to the electronic apparatus 200.

The controller 110 may control to store division guide line information received from the electronic apparatus 200 and display the division guide line corresponding to the division guide line information on the display unit 170.

The controller 110 may control to store area change information received from the electronic apparatus 200 and display the main area and the sub area corresponding to the area change information on the display unit 170.

The controller 110 may control to display a scaled content and scaled additional information, which correspond to the area change information received from the electronic apparatus 100, on the display unit 170.

The controller 110 may store LED bar flickering information or speaker sound output information received from the electronic apparatus 200 and output the LED flicking information or the speaker sound output information through an LED bar 168 or a speaker 176.

The controller 110 may control to store first touch gesture position information corresponding to a first gesture and transmit the first touch gesture position information to the electronic apparatus 200.

The controller 110 may control to store screen scroll information received from the electronic apparatus 200 and scroll the content displayed in the main area in a direction of the first touch gesture.

The controller 110 may control to store product display mode information received from the electronic apparatus 200 and change a display mode of a product displayed in the main area.

The controller 110 may control to store product information received from the electronic apparatus 200, display a product and information of the product, and rotate an image of the product.

In an embodiment of the present disclosure, the term "controller" of the display apparatus 100 includes the processor 111, the ROM 112, and the RAM 113.

A structure and an operation of the controller 110 may be variously realized according to various embodiments of the present disclosure.

The tuner 120 may amplify, mix, and resonate a broadcast signal received by wire or wireless to tune and select only a frequency of a channel that the display apparatus 100 is to receive, among many electric wave components. For example, the broadcast signal includes a video and/or an audio and additional information (e.g., an electronic program guide (EPG)) corresponding to a TV broadcast signal, a radio broadcast signal, or a data broadcast signal.

The tuner 120 may receive the broadcast signal in a frequency band corresponding to a channel number (e.g., cable broadcast number 506) according to a user input (e.g., a control signal, a channel number input, a channel up-down input, and a channel input on an EPG screen that are received from a remote controller 50).

The tuner 120 may receive broadcast signals from various types of sources, such as terrestrial broadcasting, cable broadcasting, satellite broadcasting, Internet broadcasting, and the like. The tuner 120 may receive a broadcast signal from a source, such as digital broadcasting or analog broadcasting. The broadcast signal that is received through the tuner 120 is decoded (e.g., audio-decoded, video-decoded, or additional information-decoded) to be divided into an audio, a video, and/or additional information. The divided audio, video, and/or additional information may be stored in the storage unit 180 under control of the controller 110.

The tuner 120 of the display apparatus 100 may be realized as one tuner, two tuners, or a plurality of tuners. The tuner 120 may be realized as all-in-one type along with the display apparatus 100, an additional apparatus (e.g., a set-top box (not shown)) having a tuner (not shown) that is electrically connected to the display apparatus 100, or a tuner (not shown) that is connected to the I/O unit 160.

The tuner 120 may not be included according to a performance and a structure of the display apparatus 100.

The communication unit 130 may be connected to a slave display apparatus or a server 200 under control of the controller 110 as shown in FIG. 2B. The controller 130 may transmit a content to a slave display apparatus or the server 200 of FIG. 2B and/or receive the content from the slave display apparatus or the server 200, download an application, or browse a web for the application. The communication unit 130 may transmit a content division screen to the slave display apparatus 101 or 102 or the server 200 under control of the controller 110. The controller 130 may receive slave display apparatus information under control of the controller 110.

The communication unit 130 may include one of a wireless local area network (WLAN) 131, a short-range communication unit 132, and a wire Ethernet 133 or combinations of the WLAN 131, the short-range communication unit 132, and the wire Ethernet 133.

The communication unit 130 may receive a remote control signal (including a control signal) of a remote controller (not shown) under control of the controller 110. The remote control signal that is received from the remote controller may be realized as a BT signal type or a radio frequency (RF) signal type.

The short-range communication unit 132 may include BT, e.g., BT low energy, infrared data association (IrDA), Wi-Fi direct, an Ultra Wideband (UWB), and a near field communication (NFC).

The microphone 140 receives a voice uttered by a user. The microphone 140 may convert the received voice into an electric signal and output the electric signal to the controller 110. The voice of the user may include, for example, a voice corresponding to an execution of a menu (e.g., a multi-vision output, and the like) or a function (e.g., a multi-vision output, and the like) of the display apparatus 100. A recognition range of the microphone 140 may be recommended in an area within 4 m from the microphone 140 to a user position and may vary in response to a volume of the user voice and a surrounding environment (e.g., a speaker sound, ambient noise, and the like).

The microphone 140 may be realized as an all-in-one type along with the display apparatus 100 or a separated type from the display apparatus 100. A separated type microphone (not shown) may be electrically connected to the display apparatus 100 by wireless through the communication unit 130 or the I/O unit 160.

The microphone 140 may not be included according to the performance and the structure of the display apparatus 100.

The camera 145 receives a video (e.g., consecutive frames) corresponding to a user motion including a gesture in a camera recognition range. The camera 145 may be positioned on a front surface of a bezel 10 of the display apparatus 100 (e.g., opposite to the user) or on a side of the bezel 10 (e.g., where the camera 145 is connected to the front surface of the bezel 10 protruding from an inside of the bezel 10).

A recognition range of the camera 145 may be an area between 0.1 m and 5 m from the camera 145 to the user. The user motion may include a part of a body of the user, such as a face, an expression, a hand, a first, or a finger, a motion of the part of the body of the user, and the like. The camera 145 may convert a received video into an electric signal under control of the controller 110 and output the electric signal to the controller 110.

The controller 110 may control to select a menu displayed on a screen of the display apparatus 100 by using a recognition result of a received motion or to operate a function corresponding to the recognition result of the motion. For example, the menu or the function may include a channel adjustment, a volume adjustment, an indicator movement, or a multi-vision output.

The camera 145 may include a lens (not shown) and an image sensor (not shown). The camera 145 may support an optical zoom or a digital zoom by using a plurality of lenses and image processing. A zoom recognition range of the camera 145 may be variously set according to an angle and a surrounding environment condition of the camera 145. If there are a plurality of cameras 145, a 3D still image or a 3D motion may be received by using a second camera (not shown) (e.g., having a distance longer than 2 cm and shorter than 8 cm from the first camera 145) adjacent to a first camera 145 of the bezel 10.

The camera 145 may be realized as an all-in-one type along with the display apparatus 100 or a separated type from the display apparatus 100. An additional apparatus (not shown) including a separated type camera (not shown) may be electrically connected to the display apparatus 100 by wireless through the communication unit 130 or the I/O unit 160.

The camera 145 may not be included according to the performance and the structure of the display apparatus 100.

A light receiver 150 receives a light signal (including a control signal) from an external remote controller (not shown) through a light window (not shown) positioned in the bezel 10. A material of the light window may include optical glass (e.g., crown glass, flint glass, barium crown glass, and the like), plastic (e.g., poly-methyl-meta-acrylate, polycarbonate, allyl-diglycol-carbonate, and the like), and the like.

The light receiver 150 may receive a light signal corresponding to a user input (e.g., a touch through a button, a touch gesture through a touchpad, a voice through a microphone, or a motion through a sensor) from the remote controller. The control signal may be extracted from the received light signal under control of the controller 110.

The I/O unit 160 receives a video (e.g., a moving picture, and the like), an audio (e.g., a voice, music, and the like), an image, a text, additional information (e.g., an EPG, and the like), and the like, from the outside of the display apparatus 100 under control of the controller 110. The I/O unit 160 may include one of a high-definition multimedia interface (HDMI) port 161, a component jack 162, a personal computer (PC) port 163, and a universal serial bus (USB) port 164. The I/O unit 160 may include combinations of the HDMI port 161, the component jack 162, the PC port 163, and the USB port 164.

A structure and an operation of the I/O unit 160 may be variously realized according to various embodiments of the present disclosure.

A sensor 165 may include a bezel touch sensor 166 that is positioned in the bezel 10 of the display apparatus 100 and/or a distance measuring sensor 167 that detects a distance between the master display apparatus 101 and the slave display apparatus 102 or 103.

The bezel touch sensor 166 may receive a user input that touches a side of the bezel 10 of the display apparatus 100. The bezel touch sensor 166 may be positioned on a front surface or a back surface of the bezel 10 of the display apparatus 100 and may receive the touched user input.

A user input according to an embodiment of the present disclosure may include a touch through a finger including a thumb or a touch of an input unit (not shown) including a stylus. A contact according to an embodiment of the present disclosure includes a bezel touch or bezel hovering. The bezel touch sensor 166 may receive a bezel touch and bezel hovering. A detailed description of the bezel touch sensor 166 will be described later with reference to FIG. 3.

The distance measuring sensor 167 may measure a distance between the slave display apparatuses 102 and 103 that are positioned on the front surface, the back surface, or the side of the display apparatus 100. Light that is emitted from an LED 167a of the distance measuring sensor 167 may be reflected from the slave display apparatuses 102 and 103 and then detected by a light detector (not shown). The controller 110 may calculate a distance between the master display apparatus 101 and the slave display apparatus 102 or 103 by using a time output from the distance measuring sensor 167 and a detected time. A detailed description of the distance measuring sensor 167 will be described later with reference to FIGS. 3A, 3B, and 3C.

The distance measuring sensor 167 may be used as a sensor that detects whether an external object approaches. The sensor 165 may include an additional sensor that detects a state of the display apparatus 100. For example, the sensor 165 may include an illumination sensor (not shown) that detects an amount of ambient light or a temperature sensor (not shown) that detects an internal or external temperature of the display apparatus 100. The sensor 165 may include a gyro sensor (not shown) that detects a direction by using a rotational inertia of the display apparatus 100. The sensor 165 may include an acceleration sensor (not shown) that detects an acceleration applied to three axes (e.g., x axis, y axis, and z axis) of the display apparatus 100. The sensor 165 may also respectively detect a motion acceleration and a gravity acceleration of the display apparatus 100.

The sensor 165 may detect a state of the display apparatus 100 and transmit an electric signal corresponding to the detection to the controller 110.

The LED bar (lamp or bulb) 168 may emit light under control of the controller 110. The LED bar 168 may be a set (or an array) of a plurality of LEDs. The LED bar 168 may include an LED lamp (not shown) or an LED bulb (not shown). A plurality of LED bars 168 may be included. For example, The LED bar 168 may be divided into a left LED bar, a right LED bar, an upper LED bar, a lower LED bar, and the like to respectively be disposed in a left bezel area, a right bezel area, an upper bezel area, and a lower bezel area.

If the slave display apparatus 102 or 103 approaches or a user input is received, the LED bar 168 may flicker for a set time under control of the controller 110. The set time may be, for example, between 500 msec and 1,000 msec. The set time may be changed by the user or setting of a manufacturer.

According to another embodiment of the present disclosure, at least one of the bezel touch sensor 166, the distance measuring sensor 167, and the LED bar 168 positioned in the bezel 10 may be constituted as another apparatus (not shown) outside the master display apparatus 101 and the slave display apparatuses 102 and 103. An additional apparatus (not shown) may be used as a combination member (not shown) (e.g., screws, and the like) to combine the master display apparatus 101 and the slave display apparatuses 102 and 103 with one another. For example, the additional apparatus may include one of the bezel touch sensor 166, the distance measuring sensor 167, and the LED bar 168 or combinations of the bezel touch sensor 166, the distance measuring sensor 167, and the LED bar 168.

The additional apparatus may include an additional controller (not shown) or may be electrically connected to controllers of the master display apparatus 101 and the slave display apparatuses 102 and 103 to be controlled.

The display unit 170 displays a video included in the broadcast signal received by the tuner 120 on a screen under control of the controller 110. The display unit 170 may display a content (e.g., a video image or a text) that is input through the communication unit 130 or the I/O unit 160 under control of the controller 110. The display unit 170 may output a video stored in the storage unit 180 under control of the controller 110. The display unit 170 may also display a voice user interface (UI) (e.g., including a voice command guide) for performing a voice recognition task corresponding to a voice recognition or a motion UI (e.g., a user motion guide for a motion recognition) for performing a motion recognition task corresponding to a motion recognition.

The screen of the display unit 170 may include a high definition (HD), a full HD, an Ultra HD, or a clearer definition than the Ultra HD.

A diagonal length of the screen of the display apparatus 100 may be, for example, 650 mm or less, 660 mm, 800 mm, 1,010 mm, 1,520 mm, 1,890 mm, or 2,000 mm or more. An aspect ratio of the screen of the display unit 170 may be 4:3, 16:9, 16:10, 21:9, or 21:10. Display apparatus information may include the resolution, a size, and the aspect ratio of the screen of the display unit 170.

The display unit 170 according to an embodiment of the present disclosure may output a visual feedback corresponding to a display of a content division screen and/or a transmission of content division screens to the slave display apparatuses 102 and 103 under control of the controller 110. The display unit 170 may also output a visual feedback corresponding to a display of the updated content division screen and/or a transmission of the updated content division screens to the slave display apparatuses 102 and 013 under control of the controller 110.

The audio output unit 175 outputs an audio included in the broadcast signal received by the tuner 120 under control of the controller 110. The audio output unit 175 may output an audio that is input through the communication unit 130 or the I/O unit 160 under control of the controller 110. The audio output unit 175 may output an audio stored in the storage unit 180 under control of the controller 110. The audio output unit 175 may include at least one of the speaker 176, a headphone output terminal 177, and a Sony/Philips Digital Interface (S/PDIF) output terminal 178 or combinations of the speaker 176, the headphone output terminal 177, and the S/PDIF output terminal 178.

The speaker 176 of the display apparatus 100 may include 2 channels, 2.1 channels, 4 channels, 4.1 channels, 5.1 channels, 6.1 channels, 7.1 channels, 9.1 channels, or 11.2 channels that are realized as an all-in-one type or a separated type but are not limited thereto.

The audio output unit 175 according to an embodiment of the present disclosure may output an auditory feedback corresponding to the display of the content division screen and/or the transmission of the content division screens to the slave display apparatuses 102 and 103 under control of the controller 110. The audio output unit 175 may also output an auditory feedback corresponding to the display of the updated content division screen and/or the transmission of the updated content division screens to the slave display apparatuses 102 and 103.

The storage unit 180 may store various types of data, programs, or applications for driving and controlling the display apparatus 100 under control of the controller 110. The storage unit 180 may store signals or data that are input and/or output in response to driving of the tuner 120, the communication unit 130, the microphone 140, the camera 145, the light receiver 150, the I/O unit 160, the display unit 170, the audio output unit 175, the storage unit 180, and/or the power unit 190.

The storage unit 180 may store a control program for controlling the display apparatus 100 and the controller 110, an application that is first provided by a manufacturing company or downloaded from an external source, a GUI related to the application, an object (e.g., an image text, an icon, a button, and the like) for providing the GUI, user information, a document, databases (DBs), or pieces of related data. For example, the user information may include a user identification (ID), a password, a user name, bio-information (e.g., a fingerprint, an iris, a pulse, a blood pressure, a body temperature, and the like) of the user, and the like.

The storage unit 180 may include a broadcast receiving module, a channel controlling module, a volume controlling module, a communication controlling module, a voice recognizing module, a motion recognizing module, a light receiving module, a display controlling module, an audio controlling module, an external input controlling module, a power controlling module, a power controlling module of a portable apparatus connected by wireless, a voice DB, or a motion DB that is not shown.

The modules (not shown) and the DBs (not shown) of the storage unit 180 may be realized as software types to perform a broadcast receiving control function, a channel control function, a volume control function, a communication control function, a voice recognition function, a motion recognition function, a light-receiving control function, a display control function, an audio control function, an external input control function, a power control function, or a power control function of a portable apparatus connected by wireless (e.g., through BT). The controller 110 may perform the functions as mentioned above by using pieces of software stored in the storage unit 180.

The storage unit 180 may store display apparatus information of the master display apparatus 101.

The storage unit 180 may store apparatus information of the slave display apparatus 102 or 103 that is received.

The storage unit 180 may store information about whether the slave display apparatus 102 or 103 approaches (e.g., separates, is approaching, contacts, and the like), wherein the information is measured by the distance measuring sensor 167.

The storage unit 180 may store a distance between the master display apparatus 101 and the slave display apparatus 102 or 103 measured by the distance measuring sensor 167.

The storage unit 180 may store first touch position information corresponding to a first touch input through the bezel touch sensor 166, first hovering position information corresponding to first hovering, first touch gesture position information corresponding to a first touch gesture, or second touch position information corresponding to a second touch.

The storage unit 180 may store division guide line information.

The storage unit 180 may store LED bar flickering information or speaker sound output information.

The storage unit 180 may store area change information.

The storage unit 180 may store screen scroll information.

The storage unit 180 may store product display mode information.

The storage unit 180 may store product information.

The storage unit 180 may store an area, a position, or a shape of a main area 501 on a multi-vision screen 500. The storage unit 180 may store an area, a position, or a shape of a sub area 502 on the multi-vision screen 500.

The storage unit 180 may store an area, a position, or a shape of a main area 501a that is changed. The storage unit 180 may also store an area, a position, or a shape of a sub area 502a that is changed.

The storage unit 180 may store a video or an image corresponding to a visual feedback. In addition, the storage unit 180 may store a sound corresponding to an auditory feedback.

The term "storage of the display apparatus 100" according to an embodiment of the present disclosure includes the storage 180, the ROM 112 or the RAM 113 of the controller 110, or a memory card (not shown) (e.g., a micro secure digital (SD) card, a USB memory, and the like) installed in the display apparatus 100. In addition, the storage unit 180 may include a nonvolatile memory, a volatile memory, a hard disc drive (HDD), or a solid state drive (SSD).

The power unit 190 supplies internal elements 110 through 180 of the display apparatus 100 with power, which is input from an external power source, under control of the controller 110. The power unit 190 may also supply the internal elements 110 through 180 with power, which is output from one battery or two or more batteries (not shown) positioned in the display apparatus 100, under control of the controller 110.

Elements of the slave display apparatus 102 or 103 are substantially the same as the elements 110 through 190 of the master display apparatus 101, and thus their repeated descriptions are omitted.

At least one of the elements (e.g., 110 through 190) of the display apparatus 100 shown in FIGS. 1 and 2A may be added or deleted in response to the performance of the display apparatus 100. Positions of the elements (e.g., 110 through 190) may be changed in response to the performance or the structure of the display apparatus 100.

Referring to FIG. 2B, the electronic apparatus 200 may be connected to one display apparatus 100 or a plurality of display apparatuses 100. The electronic apparatus 200 may be connected to the master display 101 and the slave display apparatuses 102 and 103 by wireless or wire by using the communication unit 230. The electronic apparatus 200 may also be connected to the master display apparatus 101 and the slave display apparatuses 102 and 103 by wire by using an I/O unit (not shown). In the embodiment of the present disclosure, the electronic apparatus 200 may be a computing apparatus (not shown), a server (not shown), and the like.

A controller 210 may include a processor 211, a ROM 212 that stores a control program for controlling the electronic apparatus 200, and a RAM 213 that stores a signal or data input from an external source or is used as a storage area corresponding to various types of jobs performed in the electronic apparatus 200.

The controller 210 controls an overall operation of the electronic apparatus 200 and a signal flow between internal elements 230 through 280 of the electronic apparatus 200, and performs a function of processing data. The controller 210 controls power that is supplied from a power unit 280 to the internal elements 230 through 275. If there is an input of a user or a preset and stored condition is satisfied, the controller 210 may execute an OS and various types of applications that are stored in the storage unit 275.

The processor 211 may include a GPU (not shown) for processing a graphic corresponding to an image or a video. The processor 211 may be realized as a SoC into which a core (not shown) and a GPU (not shown) are integrated. The processor 211 may include a single core, a dual core, a triple core, a quad core, and a multiple core.

The processor 211 may include a plurality of processors. For example, the processor 211 may be realized as a main processor (not shown) and a sub processor (not shown) that operates in a sleep mode (including a standby mode). The processor 211, the ROM 212, and the RAM 213 may be connected to one another through an internal bus.

The controller 210 may set a manual screen division or end setting of the manual screen division through a configuration of an application that controls the display apparatus 100.

The controller 210 may set the manual screen divide or end the setting of the manual screen divide through the settings of the application controlling the display apparatus 100 by an input of the user.

The controller 210 may control to detect a first touch by using a bezel touch sensor positioned in a bezel, and the first touch may include hovering.

The controller 210 may control to change one of an area and a position of a main area displayed on the display apparatus 100 in response to first touch position information corresponding to a stored first touch or first hovering position information corresponding to first hovering.

The controller 210 may control to change one of an area and a position of a sub area displayed on the display apparatus 100 in response to the first touch position information corresponding to the stored first touch or the first hovering position information corresponding to the first hovering.

The controller 210 may control to display a division guide line on the display apparatus 100 in response to the first touch position information corresponding to the stored first touch or the first hovering position information corresponding to the first hovering.

The controller 210 may control to provide a feedback by using an LED bar of at least one of a plurality of display apparatuses in response to a display of the division guide line.

The controller 210 may control to flicker the division guide line in response to the display of the division guide line.

The controller 210 may control to output a feedback corresponding to a change in one of an area and a position of a main area.

The controller 210 may scroll a content displayed in a changed main area in response to a direction of a detected first touch gesture.

The controller 210 may control to change a display mode of a content displayed in the changed main area in response to the first touch gesture.

The controller 210 may control to store first touch position information corresponding to a first touch or first hovering position information corresponding to first hovering and transmit the first touch position information or the first hovering position information to the electronic apparatus 200.

The controller 210 may transmit division guide line information to the display apparatus 100.

The controller 210 may transmit area change information to the display apparatus 100.

The controller 210 may transmit ELD bar flickering information or speaker sound output information to the display apparatus 100.

The controller 210 may transmit screen scroll information to the display apparatus 100.

The controller 210 may transmit product display mode information to the display apparatus 100.

The controller 210 may transmit product information to the display apparatus 100.

The term "controller of the electronic apparatus 200" used in the present embodiment includes the processor 211, the ROM 212, and the RAM 213.

A structure and an operation of the controller 210 of the electronic apparatus 200 may be variously realized according to various embodiments of the present disclosure.

The communication unit 230 may connect the electronic apparatus 200 to the display apparatus 100 under control of the controller 210. The communication unit 230 may transmit a content division screen to the display apparatus 100 under control of the controller 210. The communication unit 230 may download an application for controlling the display apparatus 100 or the electronic apparatus 200 from an external source under control of the controller 210. The communication unit 230 may browse a web under control of the controller 210.

The communication unit 230 may receive display apparatus information from the display apparatus 100 under control of the controller 210. The communication unit 230 may receive a detection signal of the bezel touch sensor 166 or a detection signal of the distance measuring sensor 167 from the display apparatus 100 under control of the controller 210. The communication unit 230 may receive a signal corresponding to an approach of the display apparatus 100 (e.g., detected by the distance measuring sensor 167 or the bezel touch sensor 166) or a user touch (e.g., detected by the bezel touch sensor 166) from the display apparatus 100 under control of the controller 210.

The communication unit 230 may include one of a WLAN 231, a short-range communication unit 232, and a wire Ethernet 233 in response to a performance and a structure of the electronic apparatus 200. The communication unit 230 may include combinations of the WLAN 231, the short-range communication unit 232, and the wire Ethernet 233. The WLAN 231 may be wirelessly connected to an access point (AP) (not shown) in a place whether the AP is installed, under control of the controller 210. The WLAN 231 supports WLAN standard IEEE 802.11x of IEEE. The short-range communication unit 232 may include BT, BT low energy, IrDA, a UWB, an NFC, and the like.

The I/O unit 240 may connect the electronic apparatus 200 to the display apparatus 100 under control of the controller 210. The I/O unit 240 may receive a signal corresponding to an approach of the display apparatus 100 (e.g., detected by the distance measuring sensor 167) and/or a user touch (e.g., detected by the bezel touch sensor 166) from the display apparatus 100 under control of the controller 210.

An I/O unit 240 may transmit a content corresponding to the approach of the display apparatus 100 or the user touch to the display apparatus 100 under control of the controller 210. The I/O unit 240 may output the content corresponding to the approach of the display apparatus 100 or the user touch to each of a plurality of display apparatuses 100 under control of the controller 210.

The I/O unit 240 may include an HDMI port (not shown), a display port (not shown), a digital video interface (DVI) port (not shown), a D-subminiature (D-sub) port (not shown), an unshielded twisted pair (UTP) cable port (not shown), a USB jack (not shown), and an audio out port (not shown). The audio out port may output an audio to a speaker (not shown) or a headphone (not shown) under control of the controller 210.

At least one selected form elements of the I/O unit 240 may be added or deleted in response to the performance of the electronic apparatus 200. In addition, positions of the elements may be changed in response to the performance or the structure of the electronic apparatus 200.

A display unit 260 may display a first content or a content division screen corresponding to the number of display apparatuses 100 under control of the controller 210.

The display unit 260 may display an application (not shown) that controls the display apparatus 100 under control of the controller 210. The controller 210 may set a function or an operation of the display apparatus 100 by using an application (not shown) through a user input.

The display unit 260 may display an approach of the slave display apparatus 102 or 103 to the master display apparatus 101 under control of the controller 210. The display unit 260 may provide a visual feedback corresponding to the approach of the slave display apparatus 102 or 103 to the master display apparatus 101 under control of the controller 210.

The display unit 260 may include a liquid crystal display (LCD) type, an OLED type, a plasma display panel (PDP) type, or a vacuum fluorescent display (VFD) type. The display unit 260 may also be an all-in-one type along with the electronic apparatus 200 or a separated type from the electronic apparatus 200. A separated type display apparatus (not shown) may be electrically connected to the electronic apparatus 200 through the I/O unit 240 or the communication unit 230.

A speaker 265 may output an audio under control of the controller 210. The speaker 265 may output an audio (e.g., a voice, music, a sound, and the like) that is received through the communication unit 230 and the I/O unit 240, under control of the controller 210. The speaker 265 may provide an auditory feedback corresponding to the approach of the slave display apparatus 102 or 103 to the master display apparatus 101 under control of the controller 210.

The speaker 265 may be realized as 1 channel, 2 channels, or 2.1 channels. The speaker 265 may also be realized as 4 channels, 4.1 channels, 5.1 channels, 6.1 channels, 7.1 channels, 9.1 channels, or 11.2 channels but is not limited thereto.

The storage unit 275 may store various types of data, programs, or applications for driving and controlling the electronic apparatus 200 under control of the controller 210. The storage unit 275 may store an input and/or output signal or data corresponding to driving of the communication unit 230, the I/O unit 240, the display unit 260, the speaker 265, the storage unit 275, and/or the power unit 280.

The storage unit 275 may storage a control program for controlling the electronic apparatus 200 and the controller 210, an application that is first provided by a manufacturing company or downloaded from an external source, a GUI that is related to the application, an object (e.g., an image text, an icon, a button, and the like) for providing the GUI, user information, a document, DBs, or pieces of related data. For example, the user information may include a user ID, a password, a user name, bio-information (e.g., a fingerprint, an iris, a pulse, a blood pressure, a temperature, and the like) of the user, and the like.

The storage unit 275 may store display apparatus information of the display apparatus 100 that is received.

The storage unit 275 may store information about whether the slave display apparatus 102 or 103 approaches (e.g., separates, is approaching, contacts, and the like), wherein the information is measured by the distance measuring sensor 167 of the master display apparatus 101.

The storage unit 275 may store a distance between the master display apparatus 101 and the slave display apparatus 102 that is measured by the distance measuring sensor 167 of the master display apparatus 101.

The storage unit 275 may store first touch position information, first hovering position information, and a contact position of the slave display apparatus 102 or 103 that are input through the bezel touch sensor 166 of the master display apparatus 101.

The storage unit 275 may store first touch position information corresponding to a first touch, first hovering position information corresponding to first hovering, first touch gesture position information corresponding to a first touch gesture, or second touch position information corresponding to a second touch that is input through the bezel touch sensor 166.

The storage unit 275 may store division guide line information.

The storage unit 275 may store LED bar flickering information or speaker sound output information.

The storage unit 275 may store area change information.

The storage unit 275 may store screen scroll information.

The storage unit 275 may store product display mode information.

The storage unit 275 may store product information.

The storage unit 275 may store an area, a position, or a shape of the main area 501 on the multi-vision screen 500. The storage unit 275 may also store an area, a position, or a shape of the sub area 502 on the multi-vision screen 500.

The storage unit 275 may store an area, a position, or a shape of the changed main area 501*a*. In addition, the storage unit 275 may store an area, a position, or a shape of the changed main area 502*a*.

The storage unit 275 may store a video or an image corresponding to a visual feedback. The storage unit 275 may also store a sound corresponding to an auditory feedback.

The storage unit 275 may store a content 510 and additional information 520.

The storage unit 275 may store content division information that is transmitted to the slave display apparatus 102 or 103.

The storage unit 275 may store the area, the position, or the shape of the main area 501 on the multi-vision screen 500. The storage unit 275 may also store the area, the position, or the shape of the sub area 502 on the multi-vision screen 500.

The storage unit 275 may store the area, the position, or the shape of the changed main area 501*a*. The storage unit 275 may also store the area, the position, or the shape of the changed main area 502*a*.

The term "storage unit of the electronic apparatus 200" used herein may include the storage unit 180, the ROM 112 of the controller 110, the RAM 113 of the controller 110, or a memory card (not shown) (e.g., a micro SD card, a USB memory, and the like) installed in the display apparatus 100.

In addition, the storage unit 275 may include a nonvolatile memory, a volatile memory, a HDD, or an SDD.

The power unit 280 supplies the internal elements 210 through 275 of the electronic apparatus 200 with power, which is input from an external power source, under control of the controller 210. The power unit 280 may also supply the internal elements 210 through 275 with power, which is output from one battery or two or more batteries (not shown) positioned in the electronic apparatus 200, under control of the controller 210.

At least one of the elements 210 through 280 of the electronic apparatus 200 illustrated in FIGS. 1, 2A, and 2B may be added or deleted in response to the performance of the electronic apparatus 200. In addition, positions of elements (e.g., the elements 210 through 280) may be changed in response to the performance or the structure of the electronic apparatus 200.

Figure 3A:
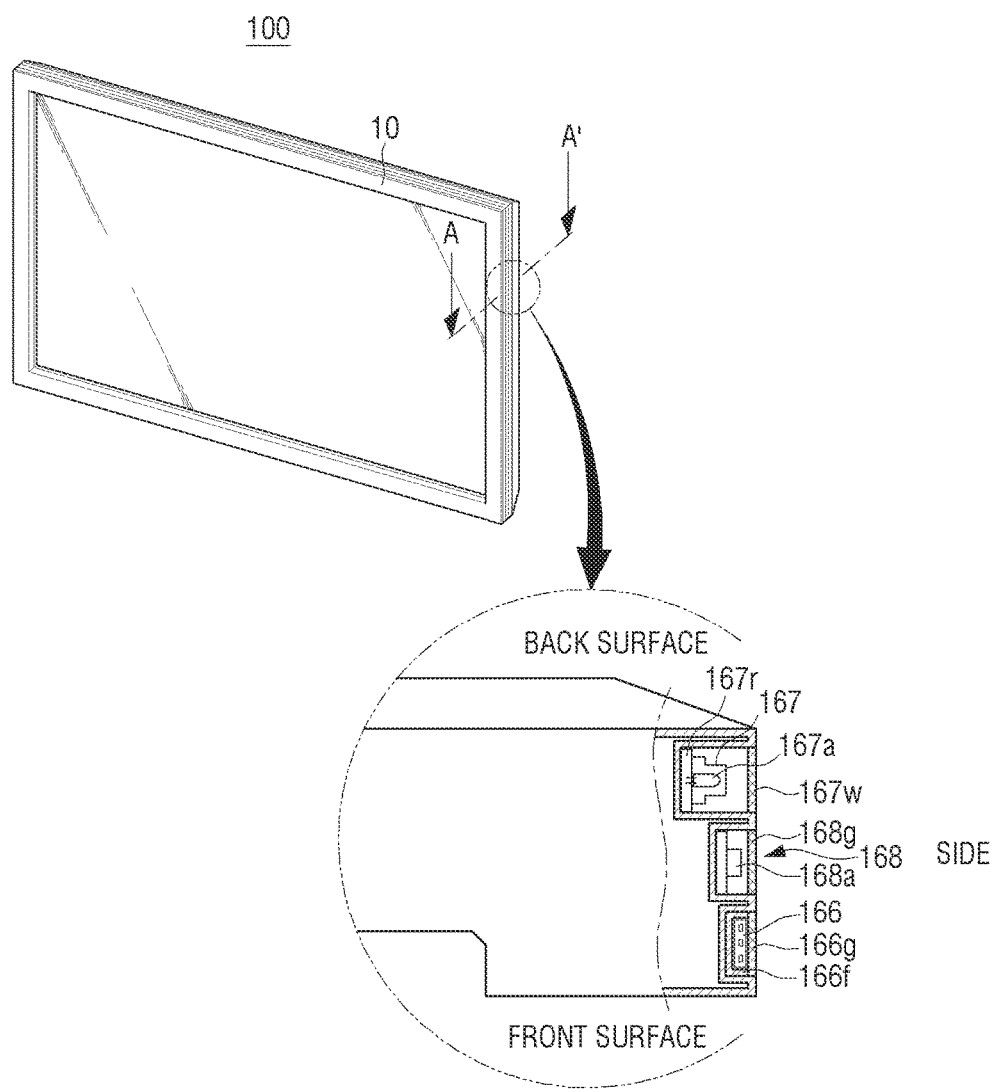
FIGS. 3A, 3B, and 3C are schematic views illustrating a bezel of a display apparatus according to an embodiment of the present disclosure.
Figure 3B:
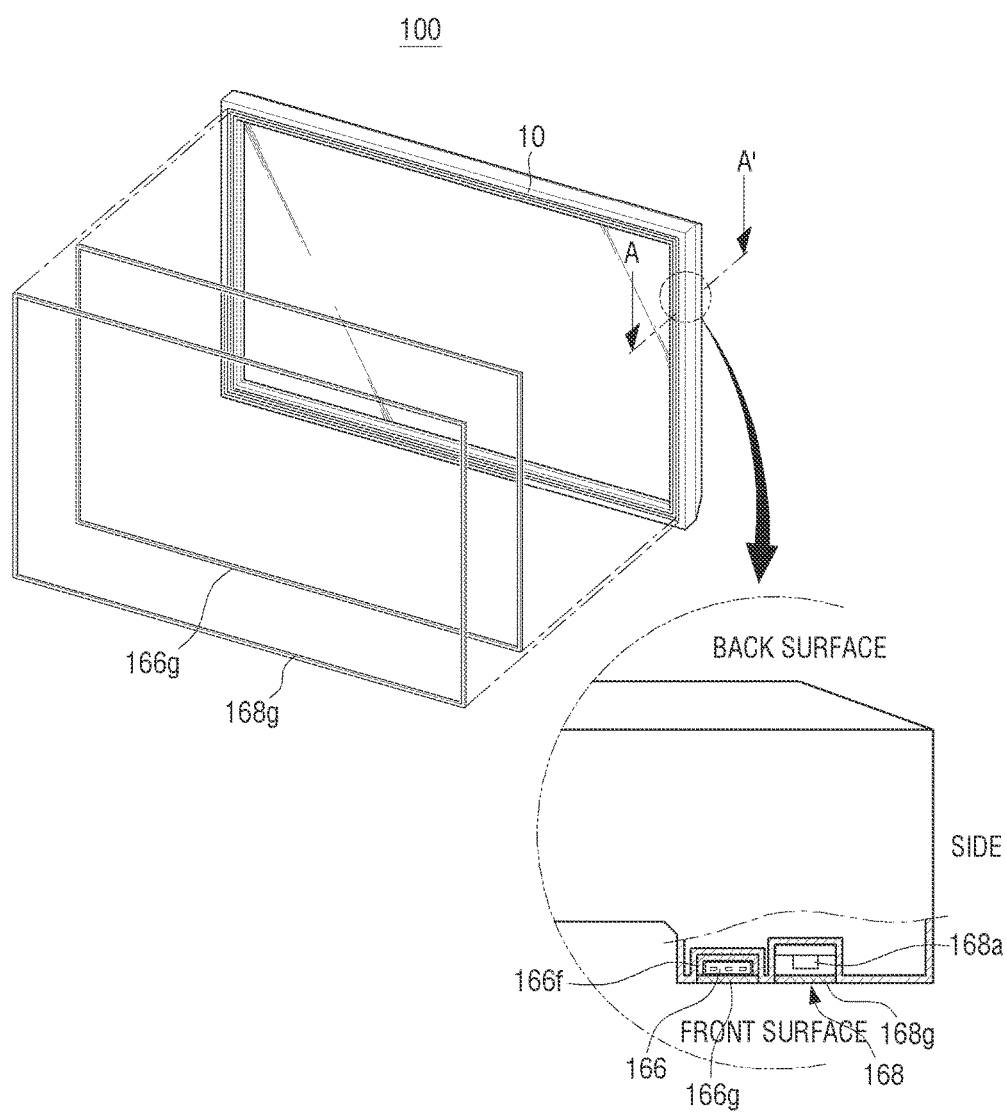
Figure 3C:
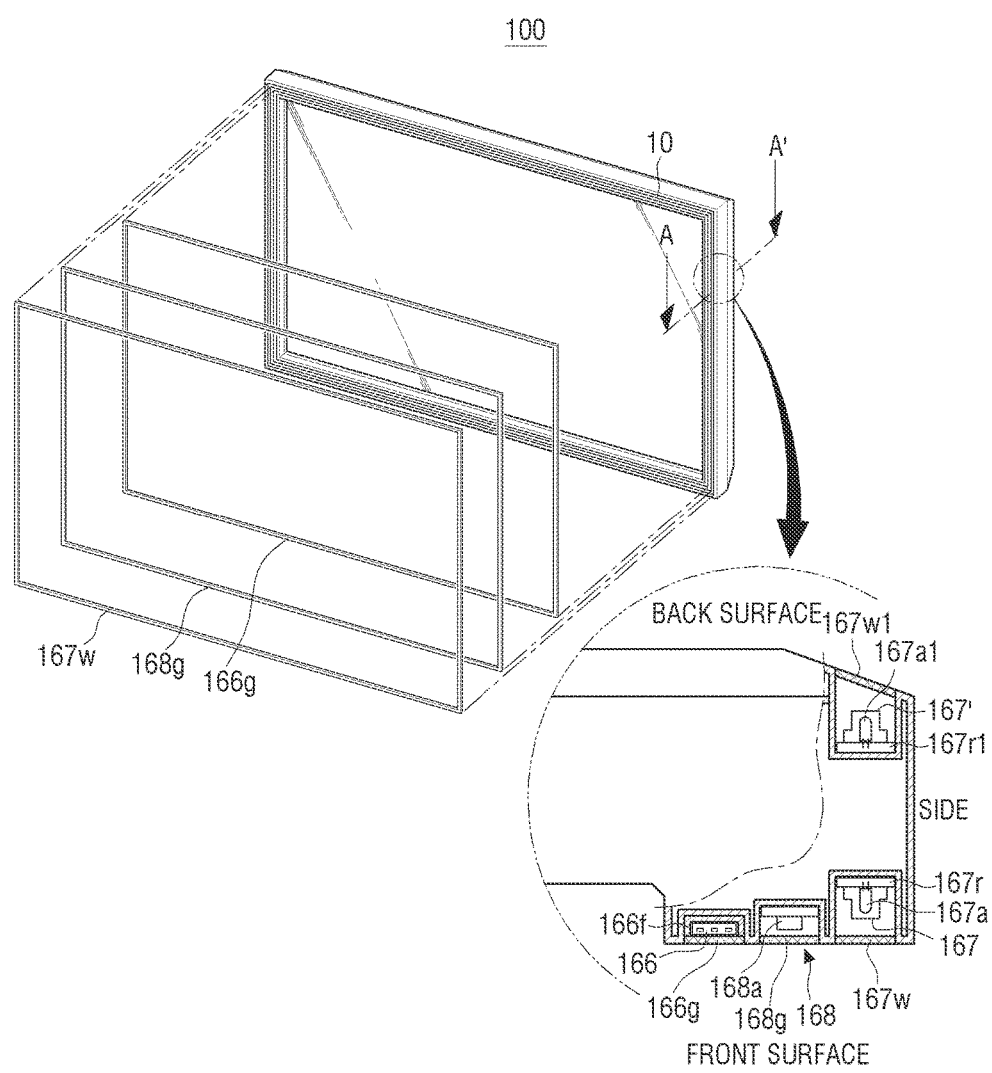

FIGS. 3A, 3B, and 3C are schematic views illustrating a bezel of a display apparatus according to an embodiment of the present disclosure.

Referring to FIG. 3A, the sensor 165 and the LED bar 168 may be positioned on a side of the bezel 10 that encloses and supports the display unit 170.

The bezel 10 may be formed of a metal material (e.g., aluminum, and the like), high-strength and/or high-elasticity reinforced plastic, or high-strength and/or high-electricity carbon fiber. The bezel 10 may also have a gradient or a curvature corresponding to the structure and/or performance of the display apparatus 100. The gradient of the bezel 10 may be calculated by using a width of a front surface of the bezel 10. The curvature of the bezel 10 may be calculated by using a connection area between the front surface and the side of the bezel 10.

The bezel touch sensor 166, the distance measuring sensor 167, and/or the LED bar 168 may be positioned in grooves formed in the side of the bezel 10. A side of the groove formed in the side of the bezel 10 may contact one of both sides of the bezel touch sensor 166, one of both sides of the distance measuring sensor 167, or one of both sides of the LED bar 168. The grooves formed in the side of the bezel 10 may be formed in four places of the bezel 10 of the display apparatus 100. The grooves formed in the side of the bezel 10 may be connected to one another.

If the user touches (or non-touches including hovering) the bezel touch sensor 166, a bezel touch sensor controller (not shown) may output an electric signal (e.g., a digital signal or an analog signal) corresponding to a touch position (e.g., X and Y coordinates) to a controller. The controller may calculate the X and Y coordinates corresponding to the touch position by using the received electric signal. The controller may detect a touch of the user corresponding to the touch position.

The bezel touch sensor 166 may include a potentiometer having a thin thickness. The bezel touch sensor 166 may detect an elaborate touch position by using a linearly changing resistance in response to the touch of the user that is received. The bezel touch sensor 166 may also detect elaborate consecutive touch positions by using a linearly changing resistance in response to consecutive motions of the received touch.

One bezel touch sensor 166 or a plurality of bezel touch sensors 166 may be used in response to a horizontal length and a vertical length of the bezel 10. For example, if the horizontal length of the bezel 10 is 1200 mm, two bezel touch sensors each having a horizontal length of 500 mm and one bezel touch sensor having a horizontal length of 200 mm may be electrically connected to one another to be used as the bezel touch sensor 166. If the vertical length of the bezel 10 is 600 mm, one bezel touch sensor having a vertical length of 500 mm and one bezel touch sensor having a vertical length of 100 mm may be electrically connected to each other to be used as the bezel touch sensor 166.

If the user consecutively touches (or non-touches including consecutive hovering) the bezel touch sensor 166, the bezel touch sensor controller (not shown) may output an electric signal (e.g., a digital signal or an analog signal) corresponding to consecutive touch positions (e.g., a plurality of X and Y coordinates) to the controller. The controller may calculate the plurality of X and Y coordinates corresponding to the consecutive touch positions by using the received electric signal. The controller may detect consecutive touch motions (e.g., touch gestures) corresponding to the consecutive touch positions.

Two or more grooves (not shown) may be formed in at least one of sides of the bezel 10 of the display apparatus 100. The bezel touch sensor 166 may be positioned in the two or more grooves formed in the side of the bezel 10. The controller may detect a one-dimensional motion (e.g., a vertical motion or a horizontal motion of a touch) and a two-dimensional motion (e.g., a diagonal motion of the touch) of an existing bezel touch sensor through a plurality of bezel touch sensors positioned in a plurality of grooves (not shown) formed in the side of the bezel 10.

The bezel touch sensor 166 may be positioned on an insulating layer (e.g., an insulating tape 166f) formed in a groove formed in the side of the bezel 10 according to a material of the bezel 10. A protection layer 166g (e.g., a film plastic layer or a glass layer) may be positioned on the bezel touch sensor 166. The protection layer 166g may protect the bezel touch sensor 166 from an external strong impact and/or damage. In addition, a color of the protection layer 166g may be the same as a color of the bezel 10. The protection layer 166g may have a gradient and/or a curvature corresponding to the gradient and/or the curvature of the bezel 10.

The bezel touch sensor 166 may be fixed onto the groove formed in the side of the bezel 10 through an adhesive tape, an adhesive, or an additional combination member (not shown) (e.g., screws, and the like). A printed circuit board (PCB) (not shown) that is electrically connected to the bezel touch sensor 166 may be positioned in a groove formed in the side of the bezel 10. The PCB may include a bezel touch sensor controller (not shown). The PCB that is electrically connected to the bezel touch sensor 166 may be positioned in the display apparatus 100. The bezel touch sensor 166 and/or the PCB may be electrically connected to a controller of the display apparatus 100.

The distance measuring sensor 167 may include an infrared light-emitting device 167a and a light-receiving device (not shown). The infrared light-emitting device 167a and the light-receiving device may be vertically disposed based on a bottom of the distance measuring sensor 167 to be laminated. In addition, the infrared light-emitting device 167a and the light-receiving device of the distance measuring sensor 167 may be horizontally disposed based on the bottom of the distance measuring sensor 167.

A distance measuring sensor array (not shown) including a plurality of distance measuring sensors 167 may be disposed in a horizontal direction from upper and lower ends of the bezel 10 of the display apparatus 100. The distance measuring sensor array including the plurality of distance measuring sensors 167 may also be disposed in a vertical direction from left and right sides of the bezel 10 of the display apparatus 100. A reflective plate 167r may be positioned underneath the distance measuring sensor 167 to reflect light output from the infrared light-emitting device 167a.

The distance measuring sensor 167 may be positioned in a groove that is formed to be adjacent to the bezel touch sensor 166. A distance between the groove in which the distance measuring sensor 167 is positioned and the groove in which the bezel touch sensor 166 is positioned is narrower than a width of the bezel 10. Light that is output from the infrared light-emitting device 167a of the distance measuring sensor 167 is reflected from the slave display apparatus 102 or 103 to be detected by the light-receiving device.

The distance measuring sensor 167 may detect an elaborate distance by using a linearly changing voltage in response to a distance between the master display apparatus 101 and the slave display apparatus 102 or 103. The distance measuring sensor 167 may also detect elaborate consecutive touch positions by using the linearly changing voltage in response to a change in the distance between the master display apparatus 101 and the slave display apparatus 102 or 103.

The controller may calculate the distance between the master display apparatus 101 and the slave display apparatus 102 or 103 by using a detected voltage and/or a light-emitting and/or light-receiving time difference. The distance measuring sensor 167 may transmit an analog signal (or a digital signal) to the controller.

The controller may calculate a distance from 2 mm to 6 m by using a received signal. A distance calculated according to a performance of a distance measuring sensor may be changed (e.g., reduced or decreased).

The distance measuring sensor 167 may be positioned on an insulating layer (not shown) (e.g., an insulating tape) formed in a groove formed in the side of the bezel 10 according to a material of the bezel 10. A light window 167w may be positioned above the distance measuring sensor 167. Lights that are respectively output light-emitting devices of a plurality of distance measuring sensors 167 may pass through the light 167w, and a plurality of light-receiving devices may receive the lights that are reflected from the slave display apparatus 102 or 103 and then pass through the light window 167w.

A material of the light window 167w may include optical glass (e.g., crown glass, flint glass, barium crown glass, and the like), plastic (e.g., poly-methyl-meta-acrylate, polycarbonate, allyl-diglycol-carbonate, and the like), and the like. The light window 167w may protect the distance measuring sensor 167 from an external strong impact and/or damage. The light window 167w may have a gradient and a curvature corresponding to the gradient and/or the curvature of the bezel 10. A light guide (not shown) may be included so as to guide light, which passes through the light window 167w, to the light-receiving device of the distance measuring sensor 167.

The distance measuring sensor 167 may be fixed into a groove formed in the side of the bezel 10 through an adhesive tape, an adhesive, or an additional combination member (not shown) (e.g., screws, and the like). A PCB (not shown) that is electrically connected to the distance measuring sensor 167 may be positioned in the groove formed in the side of the bezel 10. The PCB may include a distance measuring sensor controller (not shown).

The distance measuring sensor 167 may include a distance measuring sensor controller (not shown). The PCB that is electrically connected to the distance measuring sensor 167 may be positioned in the display apparatus 100. The distance measuring sensor 167 and/or the PCB may be electrically connected to the controller of the display apparatus 100.

The LED bar 168 may be a set (or an array) of a plurality of LEDs 168a.

A groove where the LED bar 168 is positioned may be formed between a groove where the distance measuring sensor 167 is positioned and a groove where the bezel touch sensor 166 is positioned. In addition, the groove where the LED bar 168 is positioned may be formed outside the groove where the distance measuring sensor 167 is positioned and the groove where the bezel touch sensor 166 is positioned.

If an approach of the slave display apparatus 102 or 103 is detected by the distance measuring sensor 167 or a user input is detected by the bezel touch sensor 166, the LED bar 168 may emit light for a preset time under control of the controller. The set time may be, for example, between 500 msec and 1,000 msec. The set time may be changed by setting of the user or a manufacturer.

One LED bar 168 or a plurality of LED bars 168 may be used in response to a horizontal length and a vertical length of the bezel 10. For example, if the horizontal length of the bezel 10 is 1,200 mm, three LED bars 168 each having a horizontal length of 400 mm may be electrically connected to one another to be used. If the vertical length of the bezel 10 is 600 mm, one LED bar 168 having a vertical length of 400 mm and one LED bar 168 having a vertical length of 200 mm may be electrically connected to each other to be used.

The LED bar 168 may be positioned on an insulating layer (not shown) (e.g., an insulating tape) formed in a groove formed in the side of the bezel 10 according to a material of the bezel 10. In addition, a protection layer 168g (e.g., a film, a plastic light guide plate, or a glass light guide plate) may be positioned on the LED bar 168. The protection layer 168g may protect the LED bar 168 from an external strong impact and/or damage. In addition, a color of the protection layer 168g may be the same as a transparent color, white, or a color of the bezel 10. The protection layer 168g may have a gradient and/or a curvature corresponding to the gradient and/or the curvature of the bezel 10.

The LED bar 168 may be fixed into a groove formed in the side of the bezel 10 through an adhesive tape, an adhesive, or an additional combination member (not shown) (e.g., screws, and the like). A PCB (not shown) that is electrically connected to the LED bar 168 may be positioned in the groove formed in the side of the bezel 10. The PCB that is electrically connected to the LED bar 168 may be positioned in the display apparatus 100. The LED bar 168 and/or the PCB may be electrically connected to the controller of the display apparatus 100.

Referring to FIG. 3B, only the bezel touch sensor 166 and the LED bar 168 may be positioned on the front surface of the bezel 10 that encloses and supports the display unit 170.

A width of the front surface of the bezel 10 may change according to arrangement positions (e.g., the front surface or the side of the bezel 10) of the bezel touch sensor 166, the distance measuring sensor 167, and the LED bar 168. For example, a width of the front surface of the bezel 10 where the bezel touch sensor 166 and the LED bar 168 are positioned as shown in FIG. 3B may be narrower than a width of the front surface of the bezel 10 where the bezel touch sensor 166, the distance measuring sensor 167, and the LED bar 168 are positioned as shown in FIG. 3A.

The bezel touch sensor 166 and the LED bar 168 shown in FIG. 3B are substantially similar to the bezel touch sensor 166 and the LED bar 168 shown in FIG. 3A (e.g., arrangement positions of the bezel touch sensor 166 and the LED bar 168 shown in FIG. 3 are different from arrangement positions of the bezel touch sensor 166 and the LED bar 168 shown in FIG. 3A), and thus their repeated descriptions are omitted.

Referring to FIG. 3C, the bezel touch sensor 166, the distance measuring sensor 167, and the LED bar 168 may be positioned on the front surface of the bezel 10 that encloses and supports the display unit 170. In addition, a distance measuring sensor 167' may be positioned on a back surface of the bezel 10. The distance measuring sensor 167 that is positioned on the front surface of the bezel 10 may measure a distance between the master display apparatus 101 and the slave display apparatus 102. In addition, the distance measuring sensor 167' that is positioned on the back surface of the bezel 10 may measure a distance between the master display apparatus 101 and the slave display apparatus 103.

Protection layers 167w and 167w1 of the distance measuring sensors 167 and 167' may have gradients and/or curvatures corresponding to the gradient and/or the curvature of the bezel 10. The gradient of the protection layer 167w of the distance measuring sensor 167 positioned on the front surface of the bezel 10 may be different from the gradient of the protection layer 167w1 of the distance measuring sensor 167' positioned on the back surface of the bezel 10. For example, the gradient of the protection layer 167w of the distance measuring sensor 167 may be smaller than the gradient of the protection layer 167w1 of the distance measuring sensor 167' positioned on the back surface of the bezel 10. A reflective plate 167r1 may be positioned underneath the distance measuring sensor 167' to reflect light output from the infrared light-emitting device 167a1.

The bezel touch sensor 166 and the LED bar 168 shown in FIG. 3C are substantially the same as the bezel touch sensor 166 and the LED bar 168 shown in FIG. 3B, and thus their repeated descriptions are omitted.

At least one element may be added to or deleted from the bezel touch sensor 166, the distance measuring sensor 167, or the LED bar 168 positioned on the bezel 10 as shown in FIGS. 3A, 3B, and 3C according to the performance of the display apparatus 100. In addition, a position of the bezel touch sensor 166, the distance measuring sensor 167, or the LED bar 168 positioned on the bezel 10 may be changed according to the performance or the structure of the display apparatus 100.

FIG. 4 is a flow chart illustrating a method of displaying a screen of a display apparatus according to an embodiment of the present disclosure.

FIGS. 5A, 5B, 5C, 5D, 5E, 5F, 5G, and H are views illustrating a method of displaying a screen of a display apparatus according to an embodiment of the present disclosure.

Referring to FIG. 4, in operation S410 of FIG. 4, a manual screen divide is set.

Figure 5A:
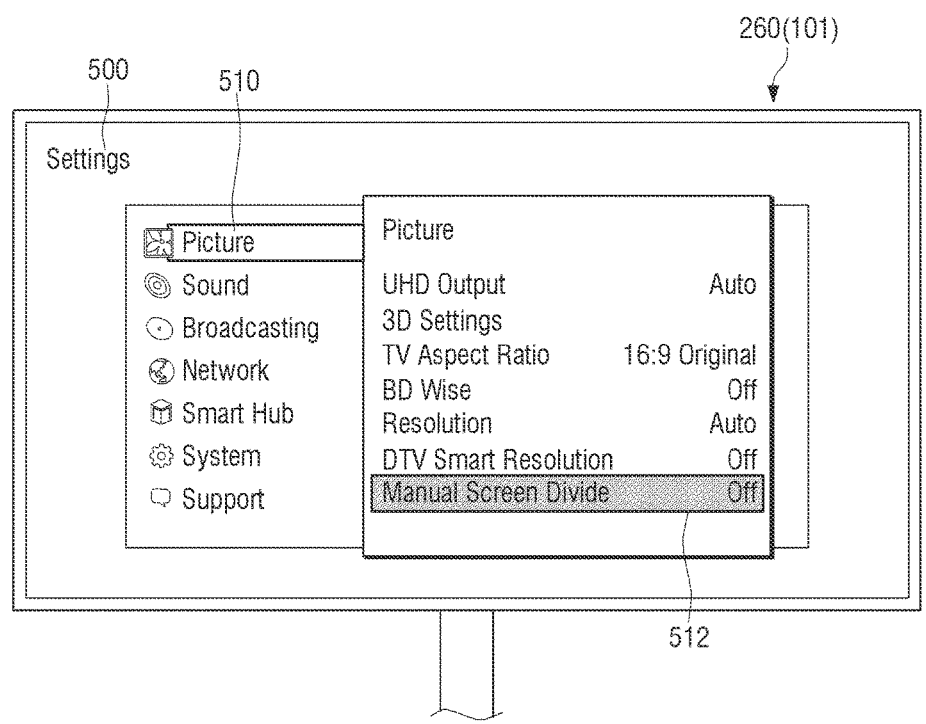
FIGS. 5A, 5B, 5C, 5D, 5E, 5F, 5G, and 5H are views illustrating a method of displaying a screen of a display apparatus according to an embodiment of the present disclosure.
Figure 5B:
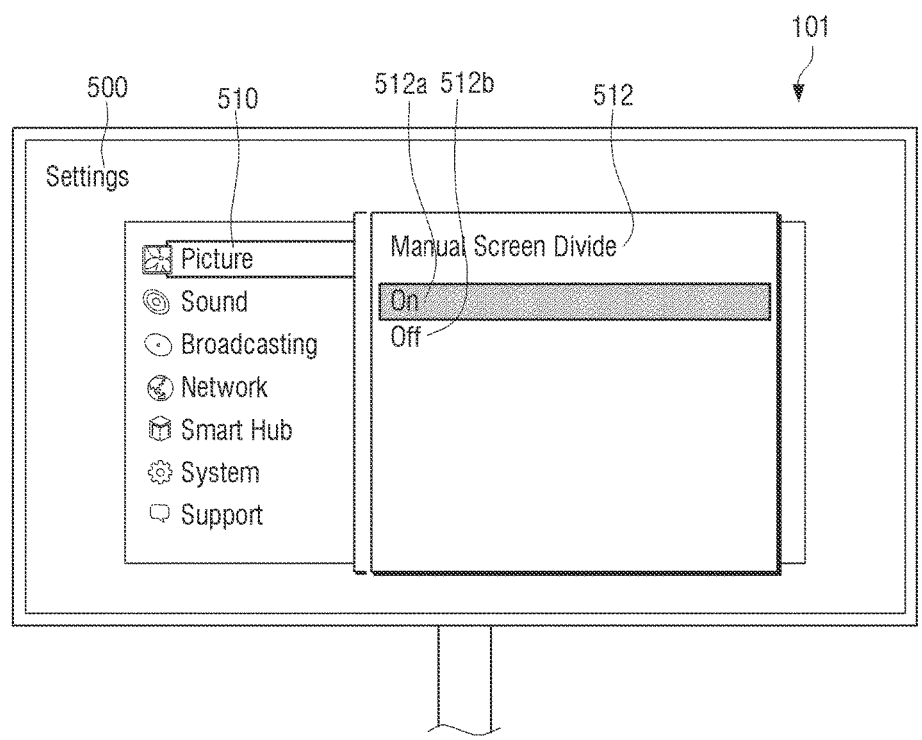

Referring to FIGS. 5A and 5B, the display unit 260 of the electronic apparatus 200 may set a manual screen divide through settings 500 (e.g., an application (not shown) that controls a display apparatus). A user may execute a shortcut icon corresponding to the application (not shown) displayed on the display unit 260 of the electronic apparatus 200. The user may also execute exclusive software (not shown) that is displayed on the display unit 260 of the electronic apparatus 200 and controls the display apparatus 100.

The user may change settings (e.g., on and/or off of a multi-vision output) of the display apparatus 100 through settings of the executed application (not shown) (or the exclusive software).

The user may select a manual screen divide 512 from a picture 510 of the settings 500 by using an input unit (not shown) (e.g., a keyboard or a mouse). The user may also select the manual screen divide 512 from the picture 510 of the settings 500 by using a voice or a motion.

If the manual screen divide 512 is selected, the controller 210 of the electronic apparatus 200 may display a pop-up window for settings of the manual screen divide 512. The manual screen divide 512 may include a manual screen divide on 512a and a manual screen divide off 512b on the displayed pop-up window.

The controller 210 of the electronic apparatus 200 may receive a selection of one of on and/or off of the manual screen divide 512 through a user input.

If the manual screen divide on 512a is selected, the controller 210 of the electronic apparatus 200 may manually (e.g., horizontally or vertically) divide screens of the master display apparatus 101 and the slave display apparatuses 102 and 103 in response to a user touch (e.g., 505 of FIG. 5C) detected by the bezel touch sensor 166 positioned in the bezel 10 of the master display apparatus 101 and the slave display apparatuses 102 and 103 that are connected. The controller 210 of the electronic apparatus 200 may respectively transmit the manually divided screens to the master display apparatus 101 and the slave display apparatuses 102 and 103 through the communication unit 230 or the I/O unit 240.

If a return and/or exit button is of the settings 500 through an input unit by the user, the controller 210 of the electronic apparatus 200 may end setting of the manual screen divide 512 on the settings 500. The manual screen divide 512 may be set or the setting of the manual screen divide 512 may be ended on the settings 500 corresponding to the display apparatus 100 by the user.

The controller 210 of the electronic apparatus 200 may control the storage unit 275 to store a result of the setting of the manual screen divide 512.

The user may select a multi-vision output (not shown) on settings (not shown) by using a voice, a motion, a keyboard (not shown), a mouse (not shown), or another type of input unit (not shown) (e.g., a stylus, and the like).

According to another embodiment of the present disclosure, the user may set a manual screen divide on the settings 500 of the display apparatus 100. The user may change settings of the master display apparatus 101 and the slave display apparatuses 102 and 103 by using a panel key (not shown) positioned on a back surface of a remote controller (not shown) or the display apparatus 100. If a menu key of the remote controller or the display apparatus 100 is selected by the user, the controller 110 of the display apparatus 100 may display the settings 500 on the screen.

The user may select the manual screen divide 512 on the picture 510 of the settings 500 by using the remote controller (not shown) or the panel key (not shown).

If the manual screen divide 512 is selected, the controller 110 of the display apparatus 100 may display a pop-up window for settings of the manual screen divide 512. A multi-vision output 511 may include the manual screen divide on 512a and the manual screen divide off 512b on the displayed pop-up window.

The controller 110 of the display apparatus 100 may receive a selection of one of on and/or off of the manual screen divided 512 through a user input.

If the manual screen divide on 512a is selected, the master display apparatus 101 and the slave display apparatuses 102 and 103 may manually (e.g., horizontally or vertically) divide a screen of the display apparatus 100 in response to a user touch detected by the bezel touch sensor 166.

If the return and/or exit button is of the remote controller or the panel key by the user, the controller 110 of the display apparatus 100 may end setting of the manual screen divide 512 on the settings 500. The manual screen divide 512 may be set or the setting of the manual screen divide 512 may be ended on the settings 500 of the display apparatus 100 by the user.

The controller 110 of the display apparatus 100 may store a result of the setting of the manual screen divide 512 in the storage unit 180.

In operation S420 of FIG. 4, a content is displayed in a main area, and additional information is displayed in a sub area.

Figure 5C:
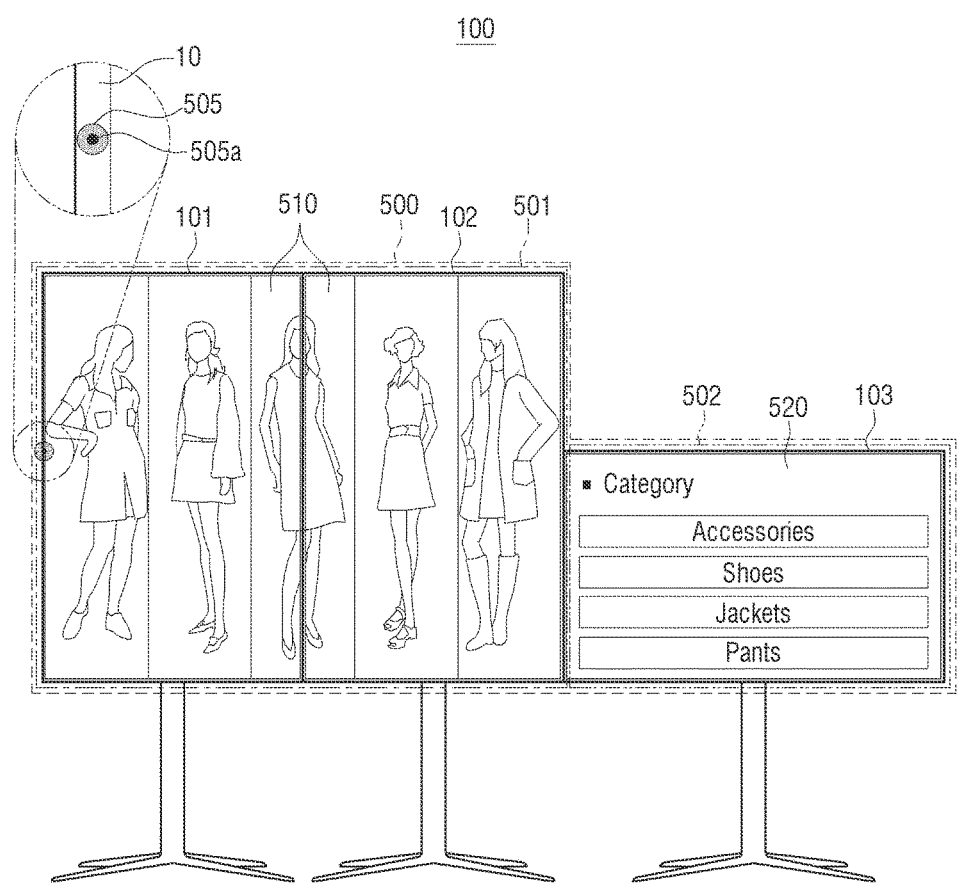
Figure 5D:
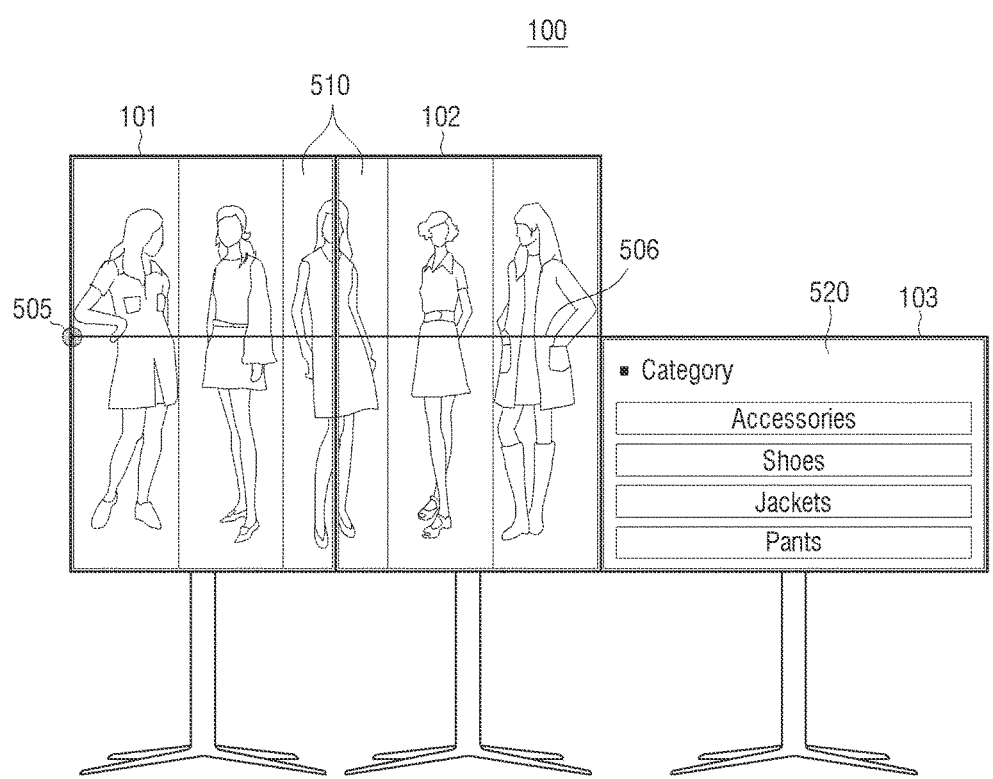
Figure 5E:
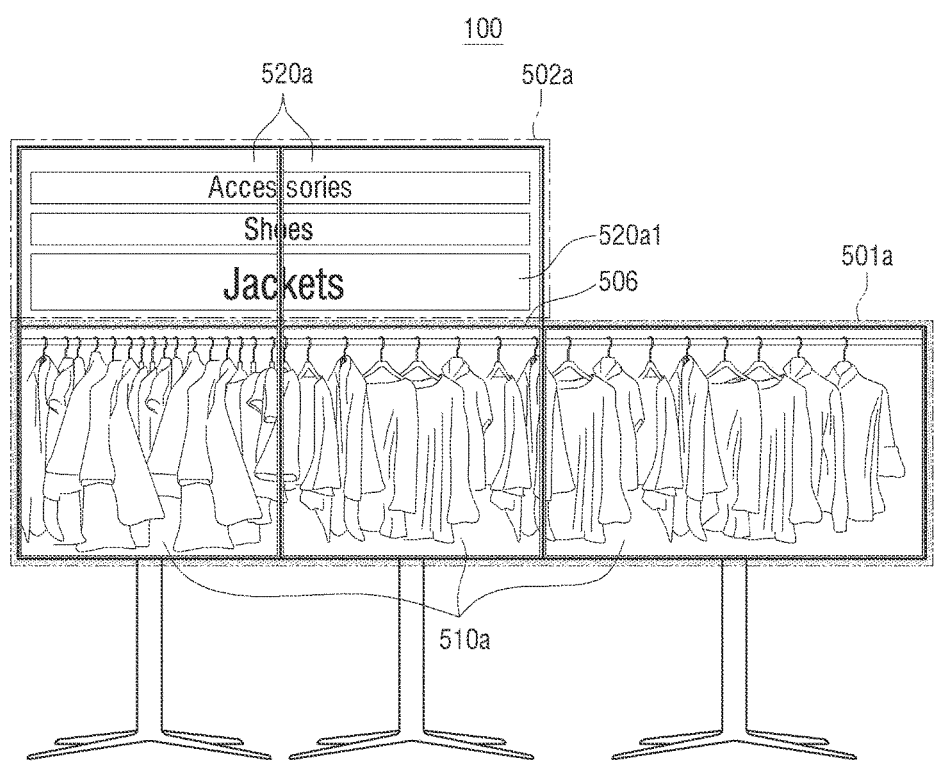
Figure 5F:
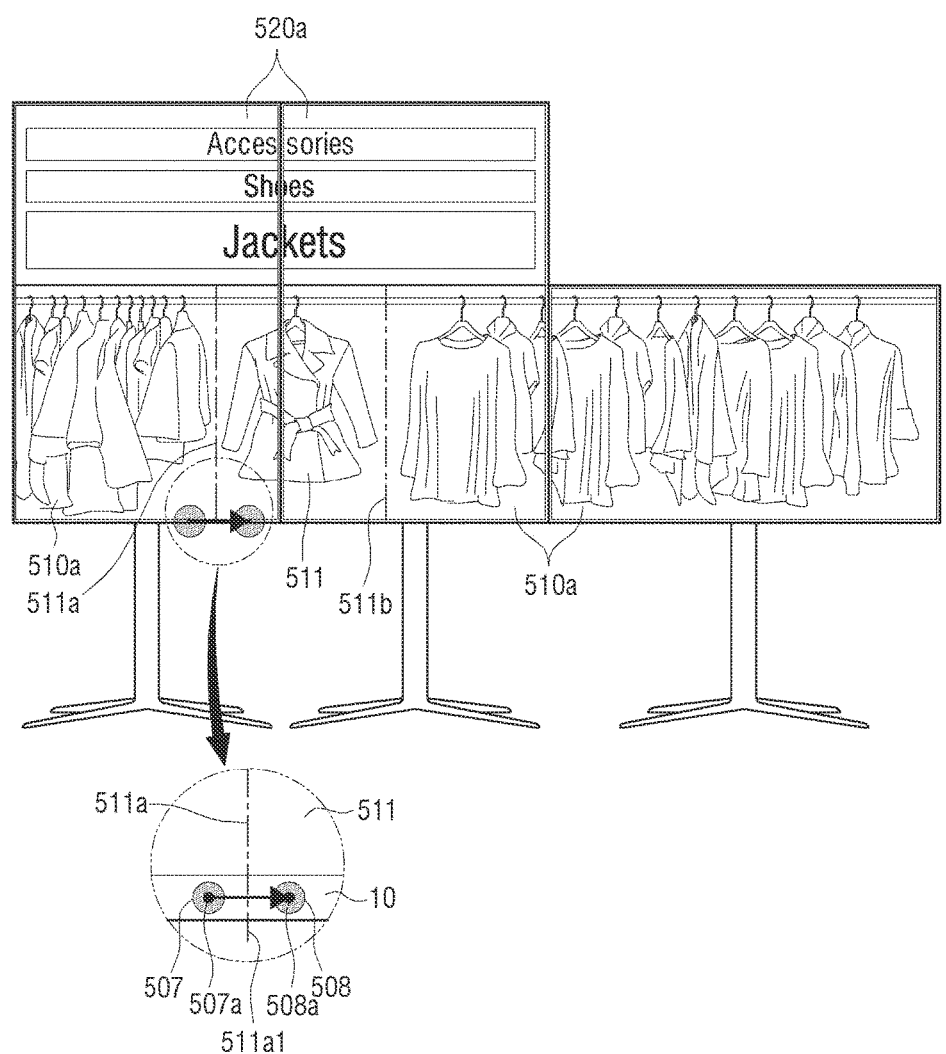
Figure 5G:
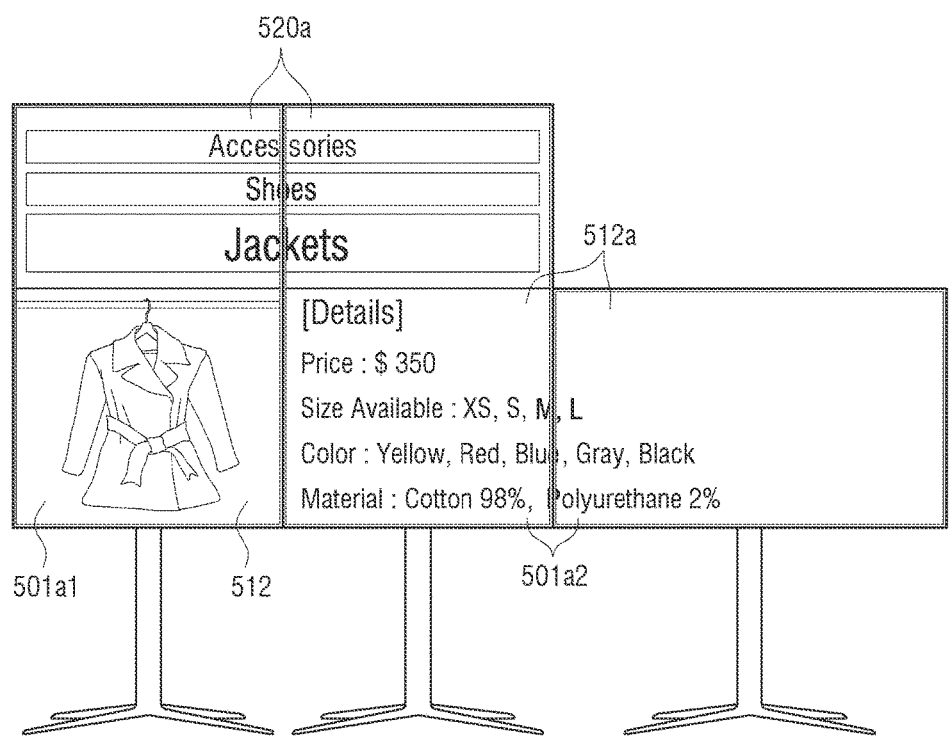
Figure 5H:
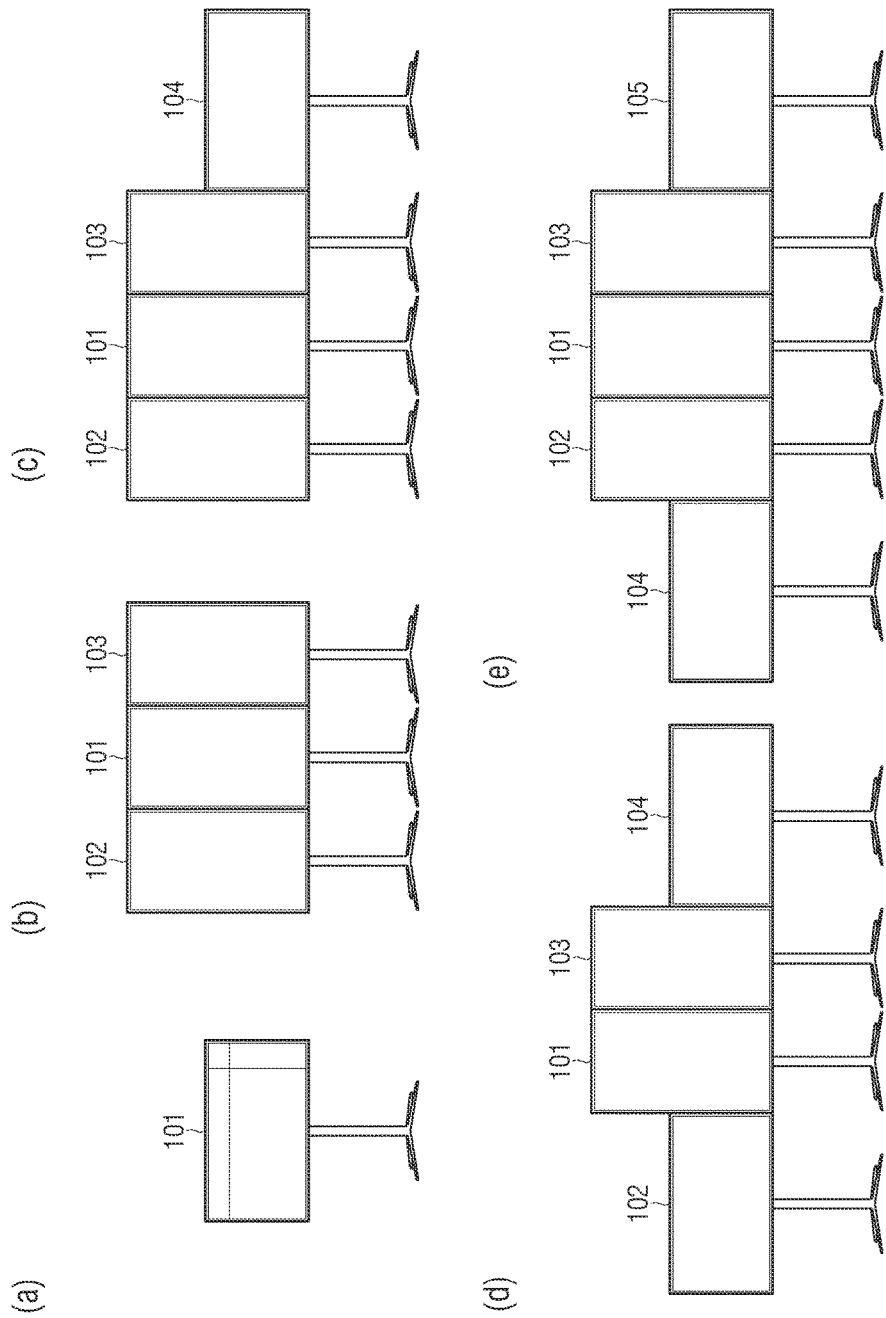

Referring to FIGS. 5C and 5H, the display apparatus 100 displays a content 510 and additional information 520 on a screen (e.g., a multi-vision screen). The controller 210 may respectively transmit the content 510 corresponding to the main area 501 and the additional information 520 corresponding to the sub area 502 to the display apparatus 100, wherein the content 510 and the additional information 520 are stored in the storage unit 275. The controller 210 of the electronic apparatus 200 may transmit the content 510 and the additional information 520, which are stored in the storage unit 180, to the slave display apparatus 102 and 103 in response to the setting of the manual screen divide 512.

A content and additional information may have the same file types (e.g., the content is an image, and the additional information is also an image) or different file types (e.g., the content is a video, and the additional information is a text, and the like).

A content displayed in a main area displayed on the master display apparatus 101 and the slave display apparatuses 102 and 103 and additional information displayed in a sub area displayed on the master display apparatus 101 and the slave display apparatuses 102 and 103 will be exemplarily described. Table 1 below may show examples of a content of a main area and additional information of a sub area displayed on the master display apparatus 101 and the slave display apparatuses 102 and 103.

TABLE 1

| Main Area | Sub Area |
| --- | --- |
| Video | Video Information/Play List/Related Movie, and the like. |
| Image (Panorama) | Image Gallery/Next Photo View/Image Editor, and the like. |
| Document | Next Page View/Related Document Show, and the like. |
| TV Broadcast | EPG information Including Channel Information, and the like. |
| Music | Music Information/Play List/Related Album, Artist/Musical Character, and the like. |

Here, a plurality of items, which indicate types of contents included in a main area and types of additional information included in a sub area, may be included but are limited thereto. Therefore, items indicating various types of information may be included.

The main area 501 and the sub area 502 displayed on the master display apparatus 101 and the slave display apparatuses 102 and 103 illustrated in FIG. 5C are an embodiment and thus may be variously disposed as shown (a) through (e) of FIG. 5H, wherein display apparatus 105 is illustrated. In addition, the main area 501 and the sub area 502 may be changed according to a screen size (e.g., the same screen size or a different screen size) and/or an arrangement of the display apparatus 100.

The master display apparatus 101 and the slave display apparatuses 102 and 103 may be combined to form a screen 500 (e.g., a multi-vision screen that is divided by a bezel of a contacting display apparatus or operates as one screen). The controller 210 of the electronic apparatus 200 may control the master display apparatus 101 and the slave display apparatuses 102 and 103 that display the multi-vision screen 500. The display apparatus 100 that includes the multi-vision screen 500 may include the master display apparatus 101 and the slave display apparatuses 102 and 103, and operate as one display apparatus 100 under control of the controller 210 of the electronic apparatus 200.

The content 510 and the additional information 520 may be displayed on the master display apparatus 101 and the slave display apparatuses 102 and 103 that include the multi-vision screen 500. In the display apparatus 100, the multi-vision screen 500 may be divided into the main area 501 displaying the content 510 and the sub area 502 displaying the additional information 520. If the multi-vision screen 500 is divided, the main area 501 may be a wide area of divided screens, and the sub area 502 may be a narrower area than the main area 501. Positions and/or areas of the main area 501 and the sub area 502 may be changed in response to the division of the multi-vision screen 500.

The content 510 may include a fashion show video, an exhibition video, or a product introduction video. The content 510 may be scaled (e.g., enlarged, reduced, and the like) and displayed according to a size of the main area 501. The content 510 may correspond to the additional information 520 displayed in the sub area 502. For example, if a user input (e.g., a touch (not shown)) is input on the additional information 520 displayed in the sub area 502, the content 510 of the main area 501 may be changed. Various types of contents may be displayed in the main area 501 of the display apparatus 100.

The additional information 520 may include a menu, a product category, or a product description corresponding to the content 510. The additional information 520 may be scaled and displayed according to a size of the sub area 502. The additional information 520 may correspond to the content 510 displayed in the main area 501. For example, if a user input (e.g., a touch (not shown)) is input on the content 510 displayed in the main area 501 or by the bezel touch sensor 166 corresponding to the main area 501, the additional information 520 of the sub area 502 may be changed. Various types of additional information may be displayed in the sub area 502 of the display apparatus 100. As shown in FIG. 5C indicating one of various embodiments of the present disclosure, the content 510 is a fashion show video, and the additional information 520 is a product category.

The content 510 and the additional information 520 may be received (including being streamed) from the electronic apparatus 200 that is connected to an outside of the display apparatus 100 (e.g., the master display apparatus 101 and the slave display apparatuses 102 and 103). The electronic apparatus 200 may control the display apparatus 100. The electronic apparatus 200 may change the content 510 and the additional information 520 displayed on the display apparatus 100 through a user input or settings. The electronic apparatus 200 may control the sensor 165 and the LED bar 168. An output value of the sensor 165 may be transmitted to the controller 110 of the display apparatus 100 or the electronic apparatus 200.

The content 510 and the additional information 520 may be received from the electronic apparatus 200 to one (e.g., the master display apparatus 101) of the master display apparatus 101 and the slave display apparatuses 102 and 103 and then re-transmitted (e.g., streamed) to the slave display apparatuses 102 and 103.

According to another embodiment of the present disclosure, the master display apparatus 101 of a plurality of display apparatuses 101 through 103 may transmit the content 510 and the additional 520 to the slave display apparatuses 102 and 103. The controller 110 of the master display apparatus 101 may transmit the content 510 and the additional information 520, which are stored in the storage unit 180, to the slave display apparatuses 102 and 103 in response to setting of the manual screen divide 512.

According to another embodiment of the present disclosure, the display apparatus 100 may display only the content 510 on the screen (e.g., a multi-vision screen). The controller 210 of the electronic apparatus 200 may control to output only the content 510 on a display screen.

The user may touch the bezel 10 of a display apparatus (not shown) that outputs only the content 510. The controller 210 of the electronic apparatus 200 may divide a screen (not shown) of a display apparatus (not shown) that outputs only the content 510, in response to the detected touch. Divided screens (not shown) may include a main area (not shown) displaying a content and a sub area (not shown) displaying additional information.

According to another embodiment of the present disclosure, a display of the content 510 and the additional information 520 through the master display apparatus 101 and the slave display apparatuses 102 and 103 is substantially similar to a display of the content 510 and the additional information 520 received from the electronic apparatus 200, and thus a repeated description thereof is omitted.

In operation 5430 of FIG. 4, a first touch is detected on a bezel.

Referring to FIG. 5C, the user performs a first touch 505 on the bezel 10 of the master display apparatus 101. The controller 110 of the master display apparatus 101 may detect the first touch 505 by using the bezel touch sensor 166 and a bezel touch sensor controller (not shown). The controller 110 of the master display apparatus 101 may receive first touch position information of a first touch position 505a corresponding to the first touch 505 from the bezel touch sensor controller. The controller 110 of the master display apparatus 101 may store the first touch position information corresponding to the first touch position 505a in the storage unit 180. The stored first touch position information may include an ID for a history management, a touch position, a touch detection time, a detection voltage (or current), and the like. The controller 110 of the master display apparatus 101 may transmit the detected first touch 505, the first touch position 505a, or the first touch position information to the electronic apparatus 200.

The first touch 505 may be made by one of fingers including a thumb or a touchable input unit (not shown) (e.g., a stylus, and the like).

The controller 110 of the master display apparatus 101 may detect first hovering (not shown) by using the bezel touch sensor 166 and the bezel touch sensor controller (not shown). The controller 110 of the master display apparatus 101 may receive first hovering position information of a first hovering position (not shown) corresponding to the first hovering from the bezel touch sensor controller (not shown).

The controller 110 of the master display apparatus 101 may store the first hovering position information corresponding to the first hovering position in the storage unit 180. The stored first hovering position information may include an ID for a history management, a hovering position, a hovering detection time, or a detection voltage (or current). The controller 110 of the master display apparatus 101 may transmit the detected first hovering, the first hovering position, or the first hovering position information to the electronic apparatus 200.

The first hovering may be made by one of fingers including a thumb or a touchable input unit (not shown) (e.g., a stylus, and the like).

The user may perform a first touch (not shown) on the bezel 10 of the slave display apparatus 102. The controller 110 of the slave display apparatus 102 may store first touch position information or first hovering position information in the storage unit 180. The controller 110 of the slave display apparatus 102 may transmit the detected first touch (not shown), a first touch position, or the first touch position information to the electronic apparatus 200.

The detection of the first touch through the slave display apparatus 102 is substantially similar to the detection of the first touch 505 of the master display apparatus 101 (e.g., the slave display apparatus 102 is different from the master display apparatus 101), and thus a repeated description thereof is omitted.

The controller 110 of the master display apparatus 101 may transmit the first touch position information or the first hovering position information, which is stored in the storage unit 180, to the electronic apparatus 200. The controller 210 of the electronic apparatus 200 may store the first touch position information or the first hovering position information in the storage unit 275.

According to another embodiment of the present disclosure, a first touch may be detected on the bezel 10 of the master display apparatus 101. The controller 110 of the master display apparatus 101 may store the first touch position information or the first hovering position information in the storage unit 180. In addition, if a first touch is detected from the slave display apparatus 102, the controller 110 of the slave display apparatus 102 may transmit the first touch position information or the first hovering position information to the master display apparatus 101. The controller 110 of the master display apparatus 101 may store first touch position information or first hovering position information, which is received from the slave display apparatus 102, in the storage unit 180.

According to another embodiment of the present disclosure, a detection of a first touch through the electronic apparatus 200 is substantially similar to a detection of a first touch through the display apparatus 100, and thus a repeated description thereof is omitted.

In operation 5440 of FIG. 4, a division guide line corresponding to a detected touch position is displayed.

Referring to FIG. 5D, if the first touch 505 is detected from the master display apparatus 101, the controller 210 of the electronic apparatus 200 may control to display a vision guide line 506 corresponding to the first touch 505 on the screen of the display apparatus 100. The controller 210 of the electronic apparatus 200 may display the division guide line 506 in a vertical direction (e.g., from the bezel 10 toward the screen) to a longitudinal direction of the bezel 10 based on the first touch position 505a of the first touch 505.

If an additional touch (not shown) is detected on the bezel 10, the controller 210 of the electronic apparatus 200 may display an additional division guide line (not shown) corresponding to the additional touch. The division guide line 506 may be parallel with or orthogonal to the additional division guide line.

The controller 210 of the electronic apparatus 200 may generate division guide line information corresponding to the division guide line. The division guide line information may include an ID for a history management, an ID of a display apparatus, division guide line lengths, division guide line widths, division guide line start positions, division guide line last positions, division guide line display times, or division guide line display end times corresponding to the master display apparatus 101 and the slave display apparatuses 102 and 103, and the like. The storage unit 275 may store the division guide line information under control of the controller 210 of the electronic apparatus 200. The controller 210 of the electronic apparatus 200 may transmit the division guide line information to the master display apparatus 101 and the slave display apparatuses 102 and 103 through the communication unit 230 or the I/O unit 240.

The controller 110 of the display apparatus 100 may receive the division guide line information from the electronic apparatus 200. The controller 110 of the display apparatus 100 may display a division guide line on a screen area of a multi-vision screen displayed on the display apparatus 100 by using the received division guide line information. The storage unit 180 may store the received division guide line information under control of the controller 110 of the display apparatus 100.

The controller 210 of the electronic apparatus 200 may divide the screen of the display apparatus 100 into the main area 501 and the sub area 502 based on the division guide line 506. In addition, the controller 110 of the master display apparatus 101 may divide the screen of the display apparatus 100 into the main area 501 and the sub area 502 based on the division guide line 506.

If the first touch 505 is maintained on the bezel 10, the user may drag (or swipe) the first touch 505 in the longitudinal direction of the bezel 10 (e.g., in an upper direction or a lower direction in FIG. 5D). If the first touch is dragged, the controller 210 of the electronic apparatus 200 may move the division guide line 506 so as to enable the division guide line 506 to correspond to a drag direction of the first touch. If the division guide line 506 is moved on the screen of the display apparatus 100, areas and/or positions of the main area 501 and the sub area 502 may be changed.

Area information corresponding to the areas and/or positions of the main area 501 and the sub area 502 may include an ID for a history management, a first touch position, a first touch detection time, a first touch end time, a first hovering position, a first hovering detection time, a first hovering end time, a first touch maintenance time, a first hovering maintenance time, a drag start time of a first touch, unchanged positions of main and/or sub areas, unchanged sizes of the main and/or sub areas, changed positions of the main and/or sub areas, changed sizes of the main and/or sub areas, a division guide line start position, a division guide line end position, and the like.

If the first touch 505 is maintained on the bezel 10, the user may drag (or swipe) the first touch 505 in the longitudinal direction of the bezel 10 (e.g., in the upper direction or the lower direction in FIG. 5D) based on the first touch 505. If the first touch is dragged, the controller 110 of the master display apparatus 101 may move the division guide line 506 so as to enable the division guide line 506 to correspond to the drag direction of the first touch. If the division guide line 506 is moved on the screen of the master display apparatus 101, the areas and/or positions of the main area 501 and the sub area 502 may be changed.

If the first touch is released from the bezel 10, the controller 210 of the electronic apparatus 200 may determine a final position of the division guide line 506.

Area information (not shown) corresponding to an area and a position of the main area 501 and an area and a position of the sub area 502 may be transmitted to the electronic apparatus 200 under control of the controller 110 of the master display apparatus 101, wherein the main area 501 and the sub area 502 are divided by the division guide line 506. The controller 210 of the electronic apparatus 200 may store the received area information in the storage unit 275.

According to another embodiment of the present disclosure, an invisible division guide line 506 may be displayed according to the first touch 505. The controller 210 of the electronic apparatus 200 or the controller 110 of the display apparatus 100 may display an invisible division guide line, which is identified with a visual acuity of the user, on the display apparatus 100. The division guide line 506 may not be displayed in response to the first touch 505. The controller 210 of the electronic apparatus 200 or the controller 110 of the display apparatus 100 may not display a division guide line on the display apparatus 100.

According to another embodiment of the present disclosure, a preview image (not shown) may be displayed on a side of the screen of the master display apparatus 101 in response to the first touch 505. If the first touch 505 is detected, the controller 210 of the electronic apparatus 200 or the controller 110 of the display apparatus 100 may display a preview image (not shown) as an additional pop-up window (not shown) on sides of the screens of the master display apparatus 101 and the slave display apparatuses 102 and 103 that are divided by the first touch 505. The preview image (not shown) may be displayed on a screen of a display apparatus (e.g., the master display apparatus 101) that detects the first touch 505. The preview image may also overlap the screen of the display apparatus (e.g., the master display apparatus 101) that detects the first touch 505. A multi-vision screen that is divided by the first touch 505 may be reduced to display the preview image on the display apparatus 100. An area of a pop-up window (not shown) including the preview image may be equal to or smaller than an area of the screen of the master display apparatus 101.

According to another embodiment of the present disclosure, referring to FIG. 5D, if the first touch 505 is detected from the master display apparatus 101, the controller 110 of the master display apparatus 101 displays the division guide line 506 corresponding to the first touch 505. The controller 110 of the master display apparatus 101 may display the division guide line 506 in a vertical direction (e.g., from the bezel 10 toward the screen) to the longitudinal direction of the bezel 10 based on the first touch position 505a of the first touch 505. If an additional touch (not shown) is detected from the bezel 10, the controller 110 of the master display apparatus 101 may display an additional division guide line (not shown) corresponding to the additional touch. The division guide line 506 may be parallel with or orthogonal to the additional division guide line.

The controller 110 of the master display apparatus 101 may divide the screen of the display apparatus 100 into the main area 501 or the sub area 502 based on the division guide line 506. The controller 110 of the master display apparatus 101 may also divide the screen of the display apparatus 100 into the main area 501 and the sub area 502 based on the division guide line 506.

If the first touch is maintained on the bezel 10, the user may drag (or swipe) the first touch 505 in the longitudinal direction of the bezel 10 (e.g., in the upper direction or the lower direction in FIG. 5D) based on the first touch 505. If the first touch is dragged, the controller 110 of the master display apparatus 101 may move the division guide line 506 so as to enable the division guide line 506 to correspond to the drag direction of the first touch. If the division guide line 506 is moved on the screen of the display apparatus 100, the areas and/or the positions of the main area 501 and the sub area 502 may be changed.

If the first touch 505 is released from the bezel 10, the controller 210 of the electronic apparatus 200 may determine a final position of the division guide line 506.

Area information that corresponds to the area and the position of the main area 501 and the area and the position of the sub area 502 may be stored in the storage unit 180 under control of the controller 110 of the master display apparatus 101, wherein the main area 501 and the sub area 502 are divided by the division guide line 506.

According to another embodiment of the present disclosure, a display of a division guide line corresponding to a first touch on the display apparatus 100 through the electronic apparatus 200 is substantially similar to a display of a division guide line corresponding to a first touch through the display apparatus 100, and thus a repeated description thereof is omitted.

In operation 5450 of FIG. 4, the main area and the sub area are changed in response to the division guide line.

Referring to FIG. 5E, the controller 210 of the electronic apparatus 200 may change a main area (e.g., from 501 to 501a) in response to the division guide line 506 that is displayed. The controller 210 of the electronic apparatus 200 may change a sub area (e.g., from 502 to 502a) in response to the division guide line 506 that is displayed.

The change in the main area (e.g., from 501 to 501a) may refer to a change in an area, a position, a size, or a shape (e.g., a polygonal shape) of the main area 501. In addition, the change in the sub area (e.g., from 502 to 502a) may refer to a change in at least one of the area, the size, and the shape of the main area. The sub area 502 may also be changed in response to the change in the main area 501 (e.g., the area, the position, the size, or the shape). For example, the area of the sub area 502 may decrease with an increase in the area of the main area 501. The position of the sub area 502 may change with a change in the position of the main area 501. The size of the sub area 502 may change with a change in the size of the main area 501. In addition, the shape of the sub area 502 may change with a change in the shape of the main area 501.

The controller 210 of the electronic apparatus 200 may generate area change information corresponding to the changes in the main area and the sub area. The area change information may include an ID for a history management, an ID of a display apparatus, an area, a position, and a size of the main area, an area, a position, and a size of the sub area corresponding to the master display apparatus 101 and the slave display apparatuses 102 and 103, an area change start time, and the like. The storage unit 275 may store the area change information under control of the controller 210 of the electronic apparatus 200. The controller 210 of the electronic apparatus 200 may transmit the area change information to the master display apparatus 101 and the slave display apparatuses 102 and 103 through the communication unit 230 or the I/O unit 240.

The controller 110 of the display apparatus 100 may receive the area change information from the electronic apparatus 200. The controller 110 of the display apparatus 100 may change an area of a multi-vision screen (e.g., a main area, a sub area, and the like) displayed on the display apparatus 100 by using the received area change information. The storage unit 180 may store the received area change information under control of the controller 110 of the display apparatus 100.

If the main area 501 and the sub area 502 are changed in response to the division guide line 506, the controller 210 of the electronic apparatus 200 may scale and display a content (e.g., a video 510) so as to enable the content to correspond to the main area 501a and the sub area 502a. In addition, if the main area 501 and the sub area 502 are changed in response to the division guide line 506, the controller 210 of the electronic apparatus 200 may scale and display additional information (e.g., a product category 520) so as to enable the additional information to correspond to the main area 501a and the sub area 502a into which the main area 501 and the sub area 502 are respectively changed.

The controller 210 of the electronic apparatus 200 may control to scale and display the content 510 so as to enable the content 510 to correspond to the area, the position, or the shape of the changed main area 501a. For example, a part of the content 510 may not be displayed based on an aspect ratio of the changed main area 501a. The controller 210 of the electronic apparatus 200 may display a scroll bar (not shown) to show the part of the content 510 that is not displayed.

The controller 210 of the electronic apparatus 200 may control to scale and display the additional information 520 so as to enable the additional information 520 to correspond to the area, the position, or the shape of the changed sub area 502a. For example, a part of the additional information 520 may not be displayed based on an aspect ratio of the changed sub area 502a. The controller 210 of the electronic apparatus 200 may display a scroll bar (not shown) to show the part of the additional information 520 that is not displayed.

If a jacket 520a1 is of additional information 520a of the sub area 502a by the user, the controller 210 of the electronic apparatus 200 may display a content (e.g., various types of jackets) in the main area 501a corresponding to the selection of the user.

The selection of the jacket 520a1 from the additional information 520a of the sub area 502a by the user is substantially similar to an input of the first touch 505 by the user, and thus a repeated description thereof is omitted.

According to an embodiment of the present disclosure, the controller 210 of the electronic apparatus 200 may control the changed main area 501a by using the bezel touch sensor 166 of the bezel 10 that encloses the main area 501a. If a touch (not shown) or a touch gesture (not shown) is detected by the bezel touch sensor 166 of the bezel 10 enclosing the main area 501a, the controller 210 of the electronic apparatus 200 may control a content 510a displayed in the changed main area 501a.

If a touch (not shown) (e.g., a double tap) is detected by the bezel touch sensor 166 of the bezel 10 enclosing the changed main area 501a, the controller 210 of the electronic apparatus 200 may change the content 510a displayed in the changed main area 501a as another category (e.g., shoes). If a touch gesture (not shown) (e.g., a swipe) is detected by the bezel touch sensor 166 of the bezel 10 enclosing the main area 501a, the controller 210 of the electronic apparatus 200 may scroll the content 510a displayed in the changed main area 501a.

A double tap or a drag that is detected by the bezel touch sensor 166 of the bezel 10 enclosing the changed main area 501a is an embodiment. Therefore, the changed main area 501a may be controlled by various types of touches or touch gestures that are detected.

According to an embodiment of the present disclosure, the controller 210 of the electronic apparatus 200 may control the changed sub area 502a by using the bezel touch sensor 166 of the bezel 10 enclosing the sub area 502a. If a touch (not shown) or a touch gesture (not shown) is detected by the bezel touch sensor 166 of the bezel 10 enclosing the sub area 502a, the controller 210 of the electronic apparatus 200 may control the additional information 520a displayed in the changed sub area 502a.

If a touch (not shown) (e.g., a double tap) corresponds to the jacket 520a1 of the additional information 520a displayed in the sub area 502a and is detected by the bezel touch sensor 166 of the bezel 10, the controller 210 of the electronic apparatus 200 may control to select shoes from the additional information 520a (e.g., a category) displayed in the changed sub area 502a. If the shoes are of the additional information 520a by the touch tap, the controller 210 of the electronic apparatus 200 may display a content (not shown) (e.g., a plurality of shoes) corresponding to the selected shoes in the changed main area 501a.

The double tap that is detected by the bezel touch sensor 166 of the bezel 10 enclosing the changed sub area 502a is an embodiment. Therefore, the changed sub area 502a may be controlled by various types of touches or touch gestures that are detected.

According to another embodiment of the present disclosure, referring to FIG. 5E, the controller 110 of the master display apparatus 101 may change a main area (e.g., from 501 to 501a) in response to the division guide line 506 that is displayed. The controller 110 of the master display apparatus 101 may change a sub area (e.g., from 502 to 502a) in response to the displayed division guide line 506.

The change (e.g., from 501 to 501a) in the main area may refer to a change in an area, a position, a size, or a shape (e.g., a polygonal shape) of the main area 501. In addition, the change in the sub area (e.g., from 502 to 502a) may refer to a change in at least one of the area, the size, and the shape of the main area. The sub area 502 may be changed in response to the change in the main area 501 (e.g., the area, the position, the size, or the shape). For example, an area of the sub area 502 may decrease with an increase in the area of the main area 501. A position of the sub area 502 may change with a change in the position of the main area 501. A size of the sub area 502 may change with a change in the size of the main area 501. A shape of the sub area 502 may change with a change in the shape of the main area 501.

If the main area 501 and the sub area 502 are changed in response to the division guide line 506, the controller 110 of the master display apparatus 101 may scale and display the content 510 (e.g., a video) so as to enable the content 510 to correspond to the changed main area 501a and the changed sub area 502a. If the main area 501 and the sub area 502 are changed in response to the division guide line 506, the controller 110 of the master display apparatus 101 may scale and display the additional information 520 (e.g., a product category) so as to enable the additional information 520 to correspond to the changed main area 501a and the changed sub area 502a.

The controller 110 of the master display apparatus 101 may scale and display the content 510 so as to enable the content 510 to correspond to the area, the position, or the shape of the changed main area 501a. For example, a part of the content 510 may not be displayed based on an aspect ratio of the changed main area 501a. The controller 210 of the electronic apparatus 200 may display a scroll bar (not shown) to show the part of the content 510 that is not displayed.

The controller 110 of the master display apparatus 101 may scale and display the additional information 520 so as to enable the additional information 520 to correspond to the area, the position, or the shape of the changed sub area 502a. For example, a part of the additional information 520 may not be displayed based on an aspect ratio of the changed sub area 502a. The controller 110 of the master display apparatus 101 may display a scroll bar to show the part of the additional information 520 that is not displayed.

If the jacket 520a1 is of the additional information 520a of the sub area 502a by the user, the controller 110 of the master display apparatus 101 may display a content (e.g., various types of jackets) in the main area 501a corresponding to the selection of the user.

The selection of the jacket 520a1 from the additional information 520a of the sub area 502a by the user is substantially similar to an input of the first touch 505 by the user, and thus a repeated description thereof is omitted.

In operation S460 of FIG. 4, feedbacks corresponding to the changes in the main area and the sub area are output.

Referring to FIG. 5E, if the main area and the sub area are changed, the controller 210 of the electronic apparatus 200 may control the master display apparatus 101 and the slave display apparatuses 102 and 103 to output at least one of a visual feedback and an auditory feedback. The visual feedback may be output through the screen and/or the LED bar 168 of the display apparatus 100. The auditory feedback may be output through the speaker 176 of the display apparatus 100.

If the main area and the sub area are changed, the controller 210 of the electronic apparatus 200 may flicker the LED bar 168 corresponding to the main area 501a for a set time. If the main area and the sub area are changed, the controller 210 of the electronic apparatus 200 may flicker the division guide line 506 crossing the main area 501a for a set time. If the main are and the sub area are changed, the controller 210 of the electronic apparatus 200 may flicker the LED bar 168 and the division guide line 506 for a set time. In addition, if the main area and the sub area are changed, the controller 210 of the electronic apparatus 200 may flicker the LED bars 168 positioned in the master display apparatus 101 and the slave display apparatuses 102 and 103. The controller 210 of the electronic apparatus 200 may generate LED bar flickering information. The LED bar flickering information may include an ID for a history management, an ID of an LED bar to flicker, a flicker start time, a flicker maintenance time, a flicker end time, and the like. The storage unit 275 may store the LED bar flickering information under control of the controller 210 of the electronic apparatus 200.

If the main area and the sub area are changed, the controller 210 of the electronic apparatus 200 may output a sound through the speaker 176 corresponding to the main area 501a for a set time. If the main area and the sub area are changed, the controller 210 of the electronic apparatus 200 may output a sound through the speaker 176 corresponding to the sub area 502a for a set time. If the main area and the sub area are changed, the controller 210 of the electronic apparatus 200 may output a sound through the speaker 176 corresponding to the main area 501a and the sub area 502a for a set time.

For example, the set time may be between 50 msec and 5,000 msec. The set time may be changed by the user or setting of a manufacturer.

The controller 210 of the electronic apparatus 200 may generate speaker sound output information. The speaker sound output information may include an ID for a history management, a sound file name, a sound end, a speaker ID, a sound output start time, a sound maintenance time, a sound output end time, and the like. The storage unit 275 may store the speaker sound output information under control of the controller 210 of the electronic apparatus 200.

The controller 210 of the electronic apparatus 200 may transmit LED bar flickering information or speaker sound output information to the master display apparatus 101 and the slave display apparatuses 102 and 103. The controller 110 of each of the master display apparatus 101 and the slave display apparatuses 102 and 103 may receive the LED bar flickering information or the speaker sound output information from the electronic apparatus 200. The controller 110 of each of the master display apparatus 101 and the slave display apparatuses 102 and 103 may drive the LED bar 168 or the speaker 176 by using the LED bar flickering information or the speaker sound output information that is received.

According to another embodiment of the present disclosure, if the main area and the sub area are changed, the controller 110 of the master display apparatus 101 may control the master display apparatus 101 and the slave display apparatuses 102 and 103 to output at least one of a visual feedback and an auditory feedback. The visual feedback may be output through the screens and/or the LED bars 168 of the master display apparatus 101 and the slave display apparatuses 102 and 103. The auditory feedback may be output through the speakers 176 of the master display apparatus 101 and the slave display apparatuses 102 and 103.

In operation 5470 of FIG. 4, a first touch gesture is detected on a bezel.

Referring to FIG. 5F, the user makes a first touch gesture (e.g., a continuous touch motion from 507 to 508) on the bezel 10 of the master display apparatus 101 and the slave display apparatuses 102 and 103. A continuous touch motion may be input from a first touch position 507 where a first touch 507 is made to a final touch position 508a where a final touch 508 is made, by the user. The controller 110 of the master display apparatus 101 may receive the continuous touch motion from the first touch position 507a to the final touch position 508a through the bezel touch sensor 166 and the bezel touch sensor controller (not shown).

The controller 110 of the master display apparatus 101 may receive coordinates of the final touch position 508a from which a touch is finally released. The controller 110 of the master display apparatus 101 may store final touch position information corresponding to the final touch position 508a in the storage unit 180. The stored final touch position information may include an ID for a history management, a touch position, a touch detection time, a detection voltage (or current), and the like. The controller 110 of the master display apparatus 101 may transmit a detected first touch gesture, a first touch gesture position, or first touch gesture position information to the electronic apparatus 200.

The first touch gesture may include a tap corresponding to a single touch, a double tap, a drag, a swipe, a flick, a rotation, and various types of touch gestures. The first touch gesture may also include a pinch corresponding to a multi-touch, a spread, a rotation, or a press and drag, and various types of touch gestures.

The user may make a second touch (e.g., 508) on the bezel 10 of the master display apparatus 101 and the slave display apparatuses 102 and 103. The second touch 508 may include a long press for maintaining the second touch 508 for a set time (e.g., for 200 ms that is changeable) or more.

The controller 110 of the master display apparatus 101 may detect the second touch 508 by using the bezel touch sensor 166 and the bezel touch sensor controller (not shown). The controller 110 of the master display apparatus 101 may receive second touch position information of the second touch position 508a corresponding to the second touch 508 from the bezel touch sensor controller. The controller 110 of the master display apparatus 101 may store the second touch position information corresponding to the second touch position 508a in the storage unit 180. The stored second touch position information may include an ID for a history management, a touch position, a touch detection time, a detection voltage (or current), and the like. The controller 110 of the master display apparatus 101 may transmit the detected second touch 508, the second touch position 508a, or the second touch position information to the electronic apparatus 200.

The second touch 508 may be made by one of fingers including a thumb or a touchable input unit (not shown) (e.g., a stylus, and the like).

The controller 110 of the master display apparatus 101 may detect second hovering (not shown) by using the bezel touch sensor 166 and the bezel touch sensor controller. The controller 110 of the master display apparatus 101 may receive second hovering position information of a second hovering position (not shown) corresponding to the second hovering from the bezel touch sensor 166 and the bezel touch sensor controller.

The controller 110 of the master display apparatus 101 may store the second hovering position information corresponding to the second hovering position in the storage unit 180. The stored second hovering position information may include a hovering position, a hovering detection time, or a detection voltage (or current). The second hovering may be made by one of fingers including a thumb or a touchable input unit (e.g., a stylus, and the like).

The controller 110 of the master display apparatus 101 may transmit the first touch gesture position information, the second touch position information, or the second hovering position information, which is stored in the storage unit 180, to the electronic apparatus 200. The controller 210 of the electronic apparatus 200 may store the first touch gesture position information, the first touch position information, or the first hovering position information, which is received, in the storage unit 275.

According to another embodiment of the present disclosure, a second touch may be detected on the bezel 10 of the master display apparatus 101. The controller 110 of the master display apparatus 101 may store first touch position information or first hovering position information in the storage unit 180. In addition, if a second touch is detected from the slave display apparatus 102, the controller 110 of the slave display apparatus 102 may transmit the second touch position information or the second hovering position information to the master display apparatus 101. The controller 110 of the master display apparatus 101 may store the second touch position information, or the second hovering position information, which is received from the slave display apparatus 102, in the storage unit 180.

According to another embodiment of the present disclosure, a detection of a first touch gesture or a second touch through the electronic apparatus 200 is substantially similar to a detection of a first touch gesture or a second touch through the display apparatus 100, and thus a repeated description thereof is omitted.

In operation 5480 of FIG. 4, a product is selected from a content screen that is displayed in response to the detected first touch gesture.

Referring to FIG. 5F, if a first touch gesture is detected on the bezel 10, the controller 210 of the electronic apparatus 200 may display a content (e.g., a plurality of jackets 510a) in the main area 501a so as to move (e.g., scroll a screen) the content toward the first touch gesture. A movement speed of the first touch gesture may be equal to or different from a screen scroll speed of the content 510a. For example, the movement speed of the first touch gesture may be faster than the screen scroll speed of the content 510a. The movement speed of the first touch gesture may be slower than the scree scroll speed of the content 510a.

The controller 210 of the electronic apparatus 200 may generate screen scroll information. The screen scroll information may include an ID for a history management, a screen scroll speed, a screen scroll start time, a screen scroll end time, and the like. The storage unit 275 may store the screen scroll information under control of the controller 210 of the electronic apparatus 200.

The controller 210 of the electronic apparatus 200 may transmit the screen scroll information to the master display apparatus 101 and the slave display apparatuses 102 and 103. The controller 110 of each of the master display apparatus 101 and the slave display apparatuses 102 and 103 may receive the screen scroll information from the electronic apparatus 200. The controller 110 of each of the master display apparatus 101 and the slave display apparatuses 102 and 103 may scroll the content 510a displayed in the main area 501a toward the first touch gesture by using the received screen scroll information.

If a movement of the first touch gesture is detected, the controller 210 of the electronic apparatus 200 may change a display mode of a first jacket (e.g., 511) corresponding to a position of the first touch gesture among the plurality of jackets 510a that are scrolled. For example, referring to FIG. 5E, a display mode of a first jacket (not shown) may be a side mode (e.g., a plurality of jackets are seen as overlapping one another). A display mode of the first jacket 511 corresponding to the position of the first touch gesture may be a front mode in FIG. 5F.

An area of the first jacket 511 (e.g., divided by an imaginary line 511a or 511b) in the front mode may be wider than an area (not shown) of the first jacket in the side mode (e.g., where a plurality of jackets overlap one another). The area of the first jacket 511 in the front mode may refer to an enlargement of the area of the first jacket in the side mode. If the area of the first jacket 511 is enlarged in the front mode, the controller 210 of the electronic apparatus 200 may display another jacket in the side mode.

If the position 508a of the first touch gesture detected on the bezel 10 passes through a bezel extension line 511a1 of a left imaginary line 511a of the first jacket 511 in the side mode, the controller 210 of the electronic apparatus 200 may change a display mode of the first jacket 511 into the front mode.

The front mode of the first jacket 511 may be maintained for a set time (e.g., 5,000 msec that is changeable). If the position 508a of the first touch gesture is positioned in the area of the first jacket 511, the front mode of the first jacket 511 may be maintained. If the position 508a of the first touch gesture is released from the area of the first jacket 511, the controller 210 of the electronic apparatus 200 may maintain the front mode of the first jacket 511 for a set time (e.g., 1,000 msec that is changeable) and change the front mode into the side mode.

If the position 508a of the first touch gesture is in an original position thereof for a set time (e.g., 500 msec that is changeable), the controller 210 of the electronic apparatus 200 may select the first jacket 511 by the user. If a touch is released from the position 508a of the first touch gesture, and an additional touch (e.g., including a tap) is detected on the bezel 10 for a set time (e.g., 1,000 msec that is changeable), the controller 210 of the electronic apparatus 200 may select the first jacket 511 by the user.

The respective set times may be changed according to a structure and/or a function of the display apparatus 10 or a structure and/or a function of the electronic apparatus 200.

According to another embodiment of the present disclosure, referring to FIG. 5F, if a first touch is detected on the bezel 10, the controller 110 of the master display apparatus 101 may display a content (e.g., the plurality of jackets 510a) in the main area 501a so as to enable the content to move toward the first touch gesture. A movement speed of the first touch gesture may be equal to or different from a screen scroll speed of the content 510a. For example, the movement speed of the first touch gesture may be faster than the screen scroll speed of the content 510a. The movement speed of the first touch gesture may be slower than the screen scroll speed of the content 510a.

If a movement of the first touch gesture is detected, the controller 110 of the master display apparatus 101 may change a display mode of the first jacket 511 corresponding to the position of the first touch gesture among the plurality of jackets 510a that are scrolled.

If the position 508a of the first touch gesture detected on the bezel 10 passes through the bezel extension line 511a1 of the left imaginary line 511a of the first jacket 511 that is in the side mode, the controller 110 of the master display apparatus 101 may change the display mode of the first jacket into the front mode.

The controller 210 of the electronic apparatus 200 may generate product display mode information. The product display mode information may include an ID for a history management, a product name, a product position, a current display mode, a current display mode start time, a current display mode maintenance time, a current display mode end time, and the like. The storage unit 275 may store the product display mode information under control of the controller 210 of the electronic apparatus 200.

The controller 210 of the electronic apparatus 200 may transmit the product display mode information to the master display apparatus 101 and the slave display apparatuses 102 and 103. The controller 110 of each of the master display apparatus 101 and the slave display apparatuses 102 and 103 may receive the product display mode information from the electronic apparatus 200. The controller 110 of each of the master display apparatus 101 and the slave display apparatuses 102 and 103 may change a display mode of a product 512 displayed in a changed main area by using the received product display mode information.

If a current position (e.g., 508a) of the first touch gesture stops in the same position for a set time (e.g., 500 msec that is changeable), the controller 110 of the master display apparatus 101 may select the first jacket 511 by the user. If a touch is released from the position 508a of the first touch gesture, and an additional touch (e.g., including a tap) is detected on the bezel 10 for a set time (e.g., 1,000 msec that is changeable), the controller 110 of the master display apparatus 101 may select the first jacket 511 by the user.

In the present disclosure, the stop of the first touch gesture may include a stop of the first touch gesture in a current position thereof for a set time, or a touch-off of the first touch gesture from the current position thereof.

According to another embodiment of the present disclosure, a selection of the first jacket 511 through the controller 110 of the master display apparatus 101 is substantially similar to a selection of the first jacket 511 through the controller 210 of the electronic apparatus 200, and a repeated description thereof is omitted.

In operation 5490 of FIG. 4, a product and information of the product are displayed in the main area in response to the selection of the product.

Referring to FIG. 5G, if the first jacket 511 is selected, the controller 210 of the electronic apparatus 200 may additionally divide the main area 501a. For example, the controller 210 of the electronic apparatus 200 may divide the main area 501a into an extension area 501a1 that displays an enlarged first jacket 512 and an information area 501a2 that displays descriptions 512a corresponding to the enlarged first jacket 512.

If the first jacket 511 is selected, the controller 210 of the electronic apparatus 200 may divide the main area 501a by using a bezel. For example, the controller 210 of the electronic apparatus 200 may divide the main area 501a into the extension area 501a1 that displays the enlarged first jacket 512 on the master display apparatus 101 and the information area 501a2 that displays the descriptions 512a corresponding to the enlarged first jacket 512 on the master display apparatus 101.

The user may check a desired product by using the enlarged first jacket 512 and the information 512a that are displayed through the master display apparatus 101 and the slave display apparatuses 102 and 013.

If a touch of the user is detected on a bezel positioned on a bottom or a side of the enlarged first jacket 512 displayed on the screen of the master display apparatus 101, the controller 210 of the electronic apparatus 200 may rotate the enlarged first jacket 512. The user may check another side of a product through the enlarged first jacket 512 that rotates.

The controller 210 of the electronic apparatus 200 may generate product information. The product information may include an ID for a history management, a product name, a product image, product information, product image rotation information, and the like. The storage unit 275 may store the product information under control of the controller 210 of the electronic apparatus 200.

The controller 210 of the electronic apparatus 200 may transmit the product information to the master display apparatus 101 and the slave display apparatuses 102 and 103. The controller 110 of each of the master display apparatus 101 and the slave display apparatuses 102 and 103 may receive the product information from the electronic apparatus 200. The controller 110 of each of the master display apparatus 101 and the slave display apparatuses 102 and 103 may display the product and the product information in a 2-divided changed main area by using the received product information. The controller 110 of each of the master display apparatus 101 and the slave display apparatuses 102 and 103 may also display the product and the product information in a changed main area, which is 2-divided through a bezel, by using the received product information. In addition, the controller 110 of each of the master display apparatus 101 and the slave display apparatuses 102 and 103 may rotate an image of the product in the changed main area, which is 2-divided through the bezel, by using the received product information.

According to another embodiment of the present disclosure, if the first jacket 511 is selected, the controller 110 of the display apparatus 100 may additionally divide the main area 501a. For example, the controller 110 of the display apparatus 100 may divide the main area 501a into the extension area 501a1 that displays the enlarged first jacket 512 and the information area 501a2 that displays the descriptions 512a corresponding to the enlarged first jacket 512.

According to another embodiment of the present disclosure, a display of a product and information corresponding to the product through the controller 110 of the master display apparatus 101 is substantially similar to a display a product and information corresponding to the product through the controller 210 of the electronic apparatus 200, and thus a repeated description thereof is omitted.

If the product and the information are displayed in the main area 501 in operation S490 of FIG. 4, the method of displaying the screen of the display apparatus ends.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a screen of a display apparatus of an electronic apparatus, the method comprising: displaying a content in a main area of a multi-vision screen comprising a plurality of display apparatuses and additional information in a sub area of the multivision screen; receiving first touch position information corresponding to a first touch detected on a bezel of one display apparatus of the plurality of display apparatuses; transmitting division guide line information corresponding to the first touch to the plurality of display apparatuses; displaying a division guide line across at least one display apparatus of the plurality of display apparatuses on the multi-vision screen in response to the first touch, the division guide line dividing the multi-vision screen into at least two areas, the at least two areas including the main area and the sub area, the at least one display apparatus including a display apparatus other than the display apparatus on which the first touch is detected; and changing one of an area and a position of the main area in response to the first touch and the division guide line, wherein one of the area or the position of the sub area are also changed in response to the changing of the one of the area or the position of the main area.

2. The method of claim 1, wherein the first touch is detected based on a bezel touch sensor positioned on the bezel of one of the plurality of display apparatuses and comprises hovering.

3. The method of claim 1, wherein a feedback is provided based on a light-emitting diode (LED) bar of at least one of the plurality of display apparatuses in response to the display of the division guide line.

4. The method of claim 1, wherein the division guide line flickers in response to the display of the division guide line.

5. The method of claim 1,
wherein one division guide line or a plurality of division guide lines is displayed on the multi-vision screen, and
wherein the plurality of division guide lines that are displayed are parallel with or cross one another.

6. The method of claim 1, wherein the changing of the one of the area and the position of the main area comprises outputting a feedback corresponding to the change in the one of the area and the position of the main area.

7. The method of claim 1, further comprising:
detecting a first touch gesture on the bezel,
wherein a content displayed in the changed main area is scrolled in response to a direction of the first touch gesture.

8. The method of claim 7, wherein a display mode of the content displayed in the changed main area is changed in response to the first touch gesture.

9. The method of claim 7, further comprising:
2-dividing the changed main area in response to a stop of the first touch gesture,
wherein a product and information of the product are displayed in the 2-divided changed main area.

10. The method of claim 9, wherein the 2-divided changed main area is divided based on a bezel contacting the plurality of display apparatuses displaying the changed main area.

11. The method of claim 1, further comprising:
setting the main area and the sub area to be changed in response to the division guide line through settings.

12. The method of claim 1, further comprising:
reducing and displaying the multi-vision screen that is divided in response to the first touch to display a preview image.

13. At least one non-transitory computer readable storage medium for storing a computer program of instructions configured to be readable by at least one processor for instructing the at least one processor to execute a computer process for performing the method of claim 1.

14. An electronic apparatus comprising: a transceiver configured to connect a plurality of display apparatuses displaying a multi-vision screen comprising a main area and a sub area; and at least one processor configured to: control the transceiver, receive first touch position information corresponding to a first touch detected on a bezel of one of the plurality of display apparatuses through the transceiver, transmit division guide line information corresponding to the first touch to the plurality of display apparatuses through the transceiver so as to enable at least one display apparatus of the plurality of display apparatuses to display a division guide line across the at least one display apparatus, the division guide line dividing the multi-vision screen into at least two areas, the at least two areas including the main area and the sub area, the at least one display apparatus including a display apparatus other than the display apparatus on which the first touch is detected, control to change one of an area and a position of the main area in response to the division guide line information, and change one of an area and a position of the sub area according to the changed one of the area and position of the main area.

15. The electronic apparatus of claim 14, further comprising:
an input/output (I/O) unit configured to connect the plurality of display apparatuses displaying the multi-vision screen comprising the main area and the sub area,
wherein the at least one processor is further configured to:
receive first touch position information corresponding to a first touch detected on a bezel of one of the plurality of display apparatuses through the I/O unit,
transmit the division guide line information corresponding to the first touch to the plurality of display apparatuses through the I/O unit, and
control to change one of the area and the position of the main area in response to the division guide line information.

16. The electronic apparatus of claim 15, further comprising:
a bezel touch sensor configured to detect the first touch, wherein the bezel touch sensor is positioned on the bezel and comprises hovering.

17. The electronic apparatus of claim 14, wherein the at least one processor is further configured to flicker light-emitting diode (LED) bars of the plurality of display apparatuses in response to the change in the main area.

18. The electronic apparatus of claim 14, wherein the at least one processor is further configured to:
receive first touch gesture position information corresponding to a first touch gesture detected on a bezel of one of the plurality of display apparatuses through the transceiver, and
scroll a content displayed in a changed main area in response to a direction of the first touch gesture.

19. The electronic apparatus of claim 18, wherein the at least one processor is further configured to 2-divide the changed main area in response to a movement stop of the first touch gesture.

20. The electronic apparatus of claim 18, wherein the 2-divided changed main area is divided based on a bezel contacting the plurality of display apparatuses displaying the changed main area.

* * * * *